UNITED STATES PATENT OFFICE.

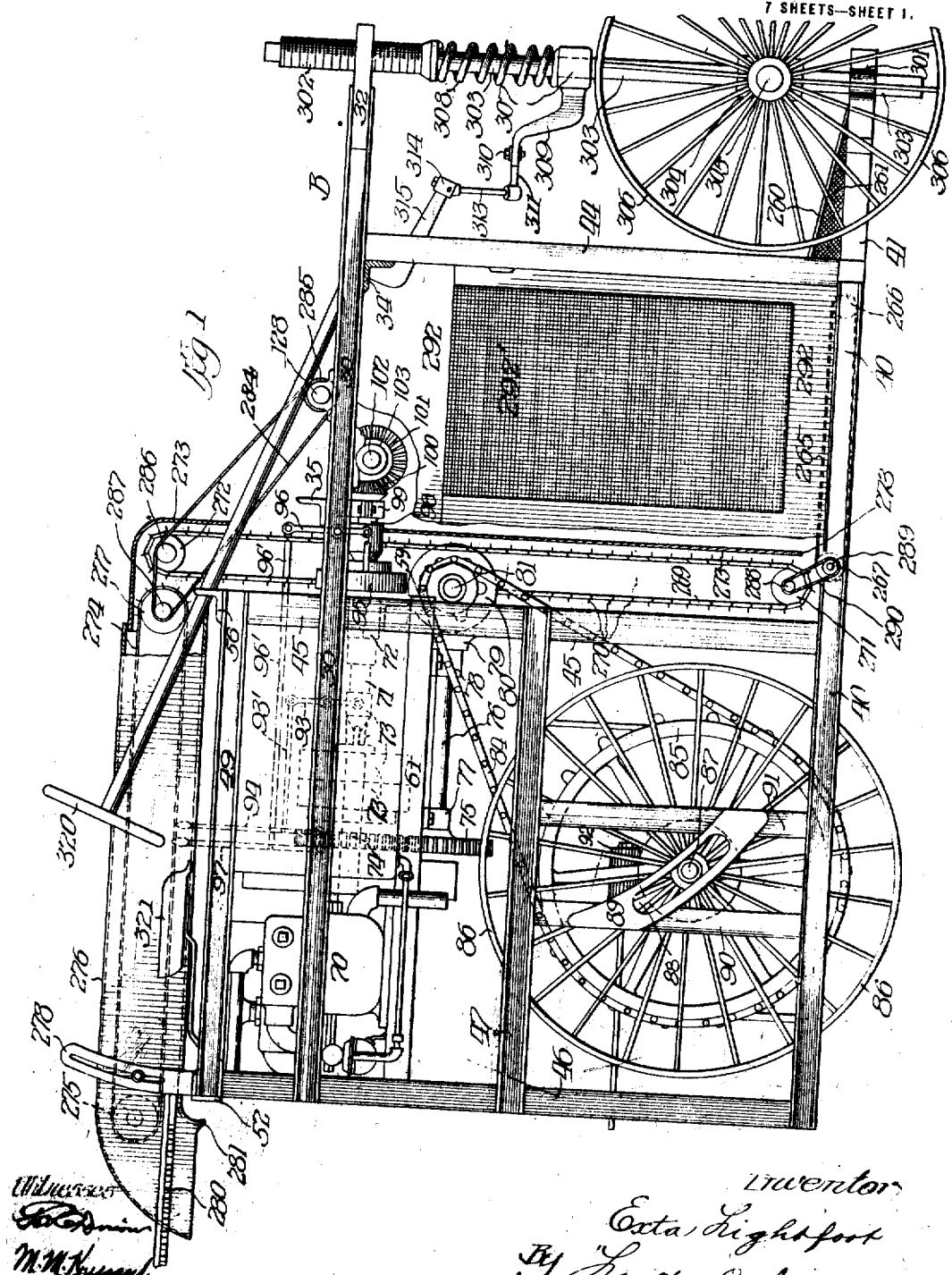

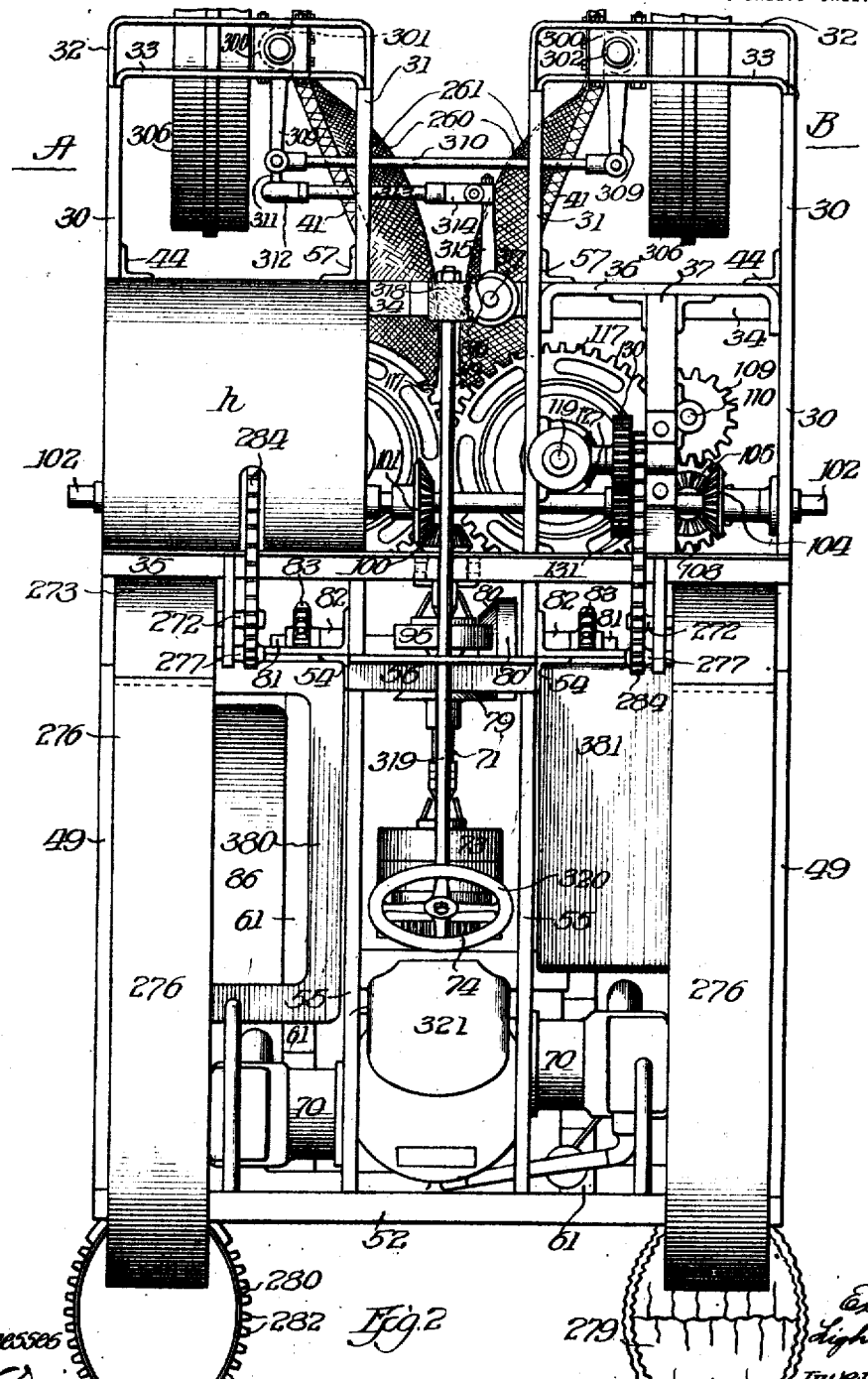

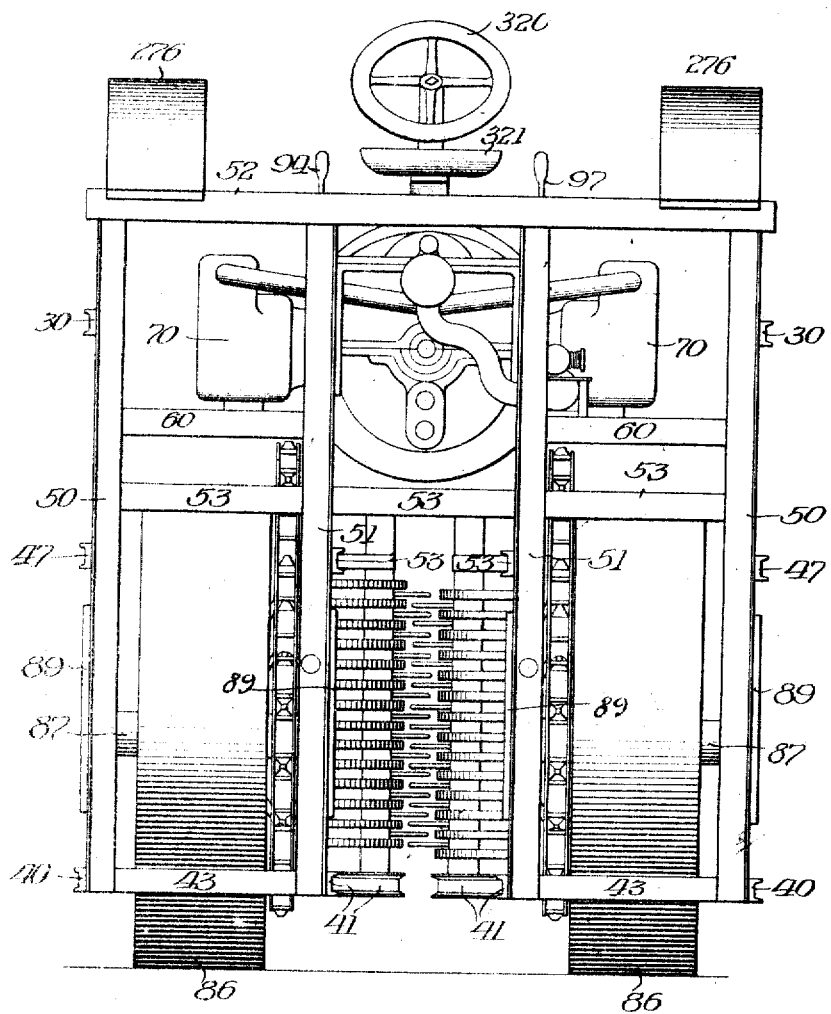

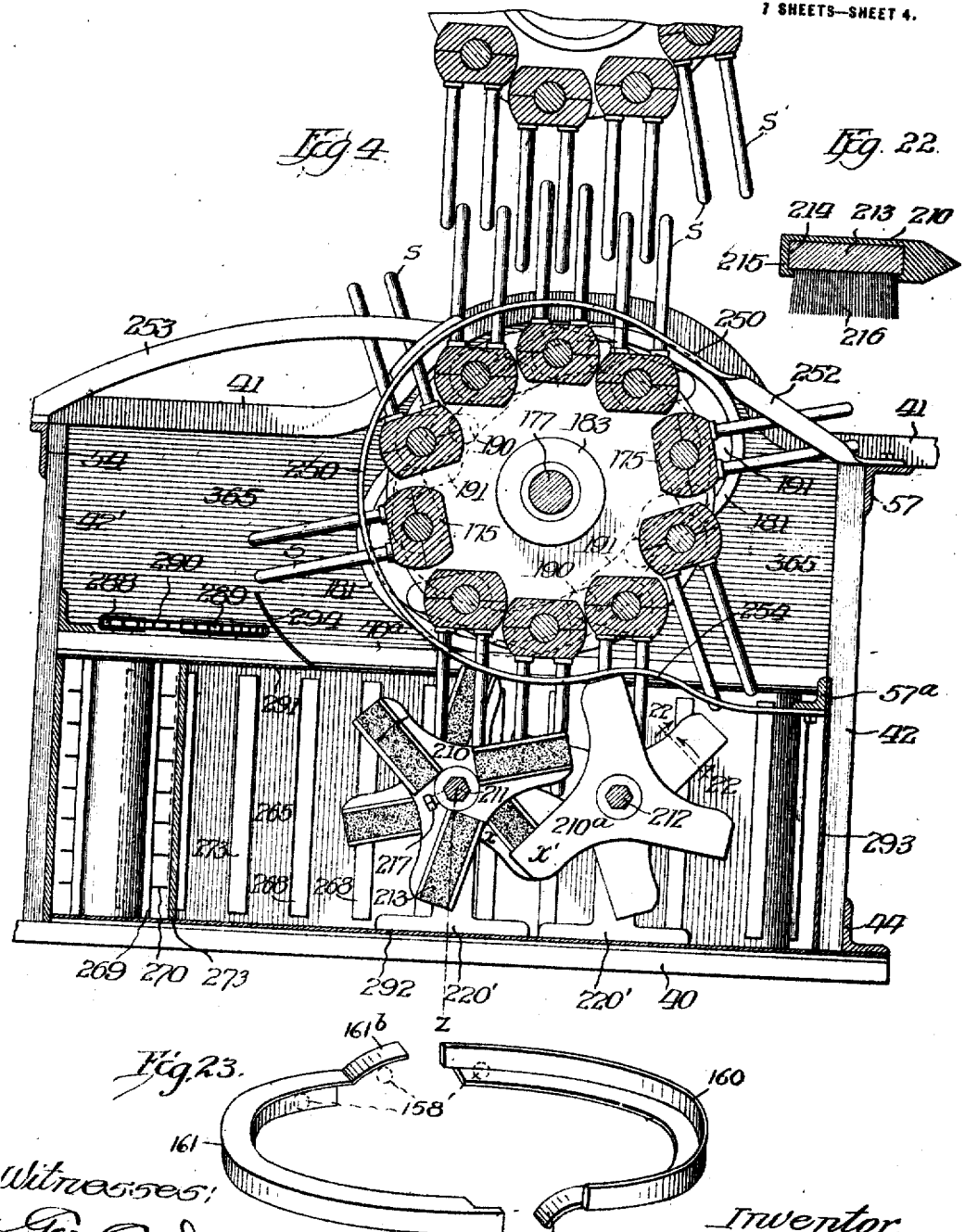

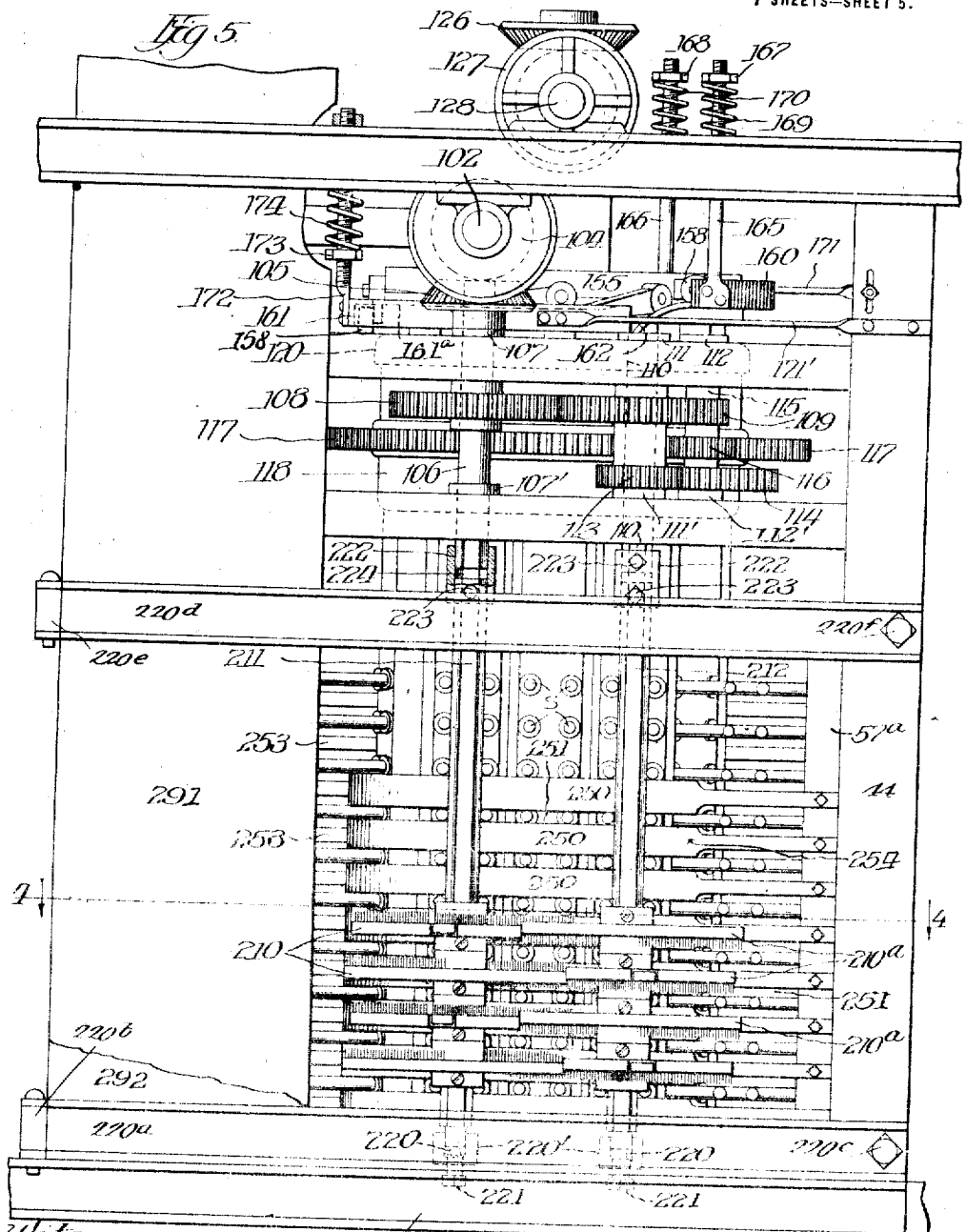

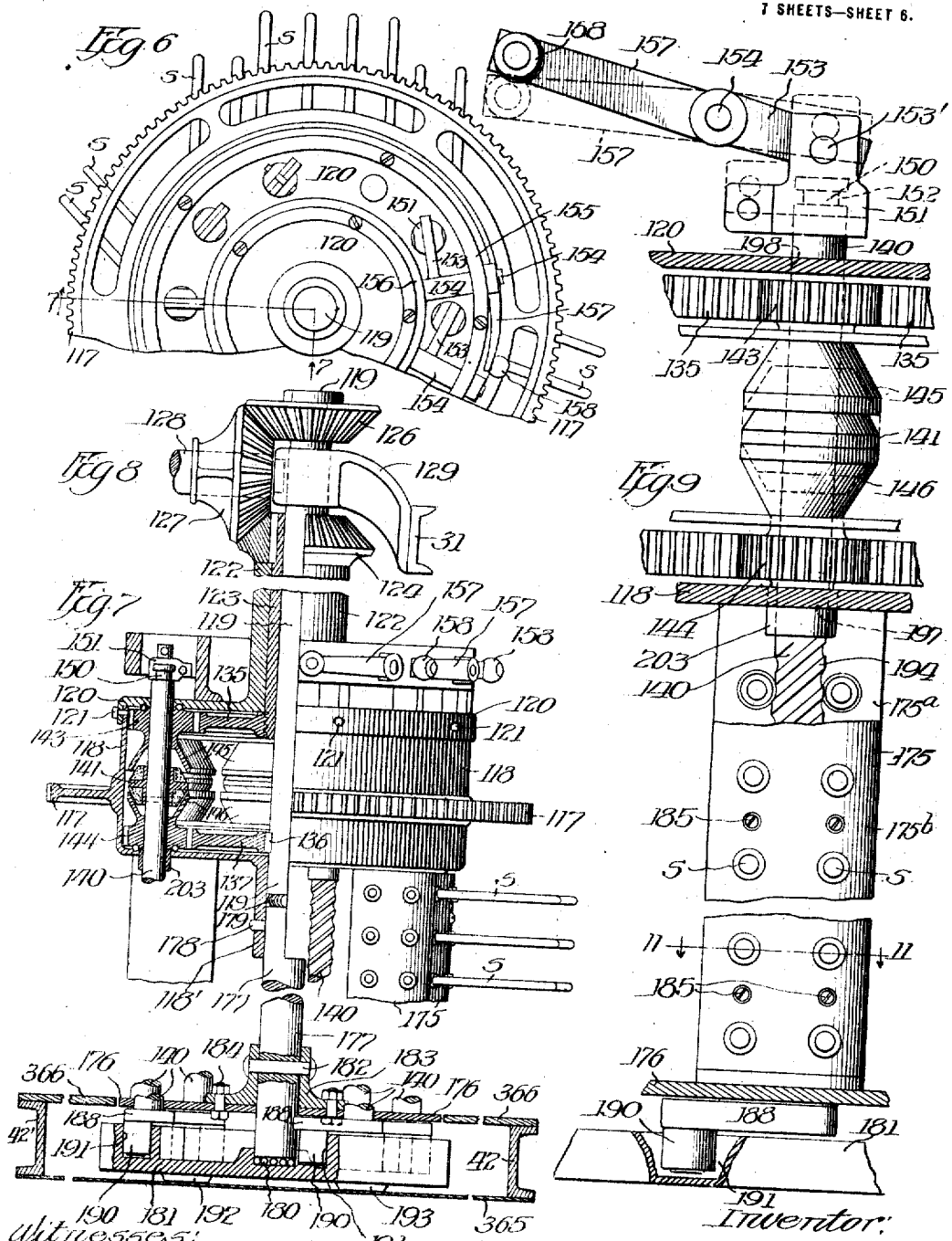

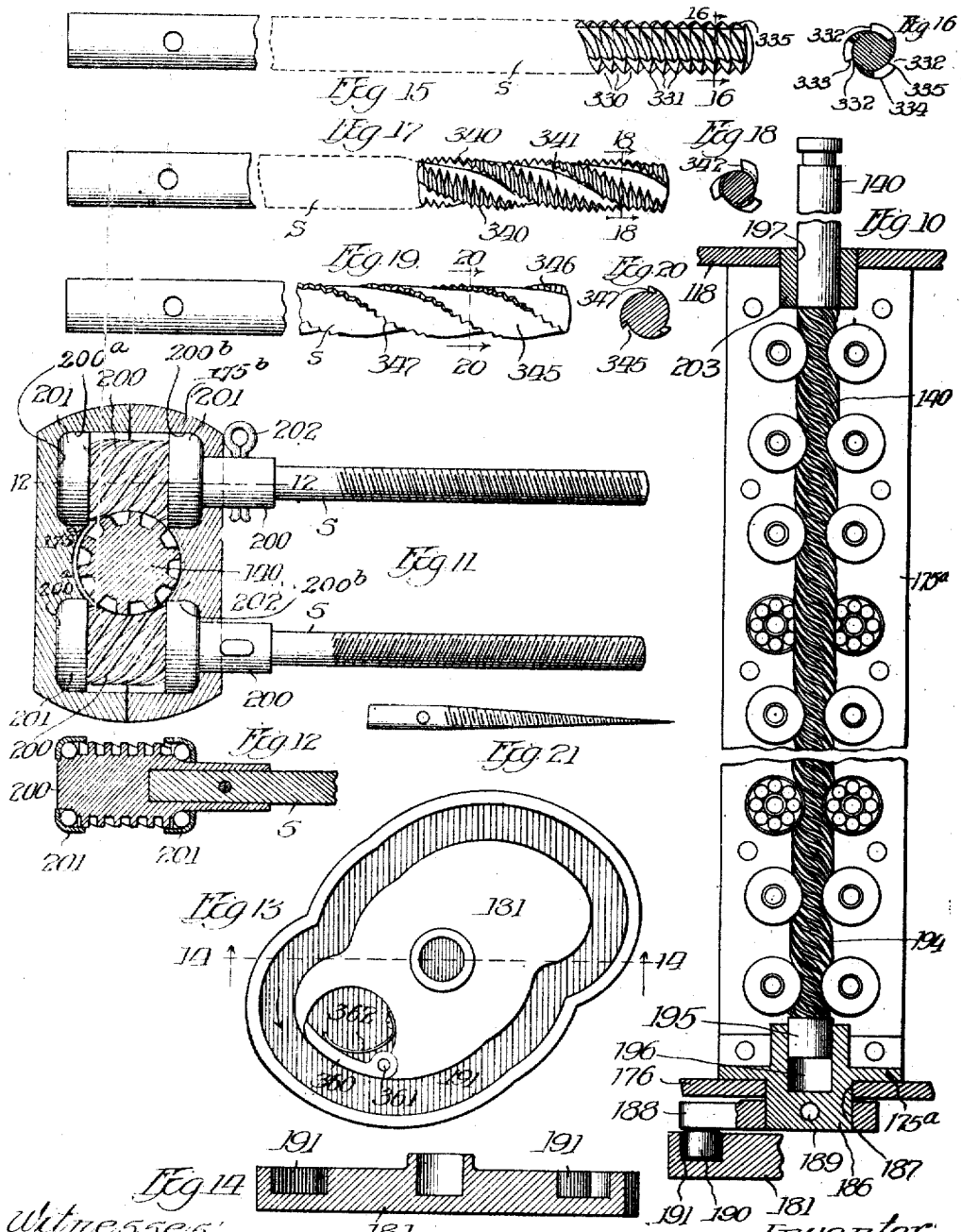

EXTA LIGHTFOOT, OF FORT WORTH, TEXAS, ASSIGNOR TO LIGHTFOOT COTTON HARVESTER COMPANY, OF CHICAGO, ILLINOIS, A CORPORATION OF ILLINOIS.

COTTON-HARVESTING MACHINE.

1,210,958.

Specification of Letters Patent.

Patented Jan. 2, 1917.

Application filed April 1, 1914. Serial No. 828,775.

*To all whom it may concern:*

Be it known that I, EXTA LIGHTFOOT, a citizen of the United States, and a resident of Fort Worth, in the county of Tarrant and State of Texas, have invented certain new and useful Improvements in Cotton-Harvesting Machines, of which the following is a specification.

My invention relates to cotton harvesting machines, and has more particular reference to cotton harvesters in which the picking spindles are carried into and out of cotton picking position through the rotation of a spindle carrying device upon which the spindles are mounted.

The principal objects of my present invention are to provide a cotton harvesting machine susceptible of being drawn or self-propelled in picking relation to a row of cotton plants, and to pick therefrom a high percentage, if not substantially all of the cotton thereon suitable for harvesting at such time; to provide a machine which may be operated and controlled by a single operator thereon, to provide a cotton harvester not only of high efficiency, but one of simple and durable construction, which is of light weight, not liable readily to get out of order, and one having provisions for adjustment and substitution of parts whereby it may be handled operatively by a person of ordinary ability and skill.

A very important object is to provide a harvester which will not objectionably injure the cotton plants during the harvesting operation, and one which will operate selectively upon only ripe cotton, or such generally as is then suitable to be picked.

Other objects and advantages will appear hereinafter.

It is not new to provide a harvesting machine to gather cotton from the row, nor is it new to provide a cotton picking machine in which rotatable spindles are carried about an axis of revolution during the operation of the machine, or in which the direction of rotation of picking spindles is reversed. Means have also been suggested for cleaning the spindles and for conveying the cotton from one part of the machine to another.

The present invention is to be distinguished from such hitherto suggested devices in various respects, as in the provision of means for varying or maintaining the direction of the longitudinal axis of the spindles for various operations; in the manner of causing the spindles to rotate in direct or reverse direction; in the means for cleaning the spindles, in the arrangement and operative location of various operative parts; driving means for the various organizations of operative elements; in the spindle itself, and in various other features of construction, arrangement, organization and results, as will be hereinafter more specifically described, and particularly pointed out and set forth in the appen    claims.

In the accompanying seven sheets of drawings, which form a part of this specification I have illustrated a preferred embodiment of my present invention, and have shown such various details of the construction and arrangement of parts as will, particularly in connection with the written specification, enable anyone skilled in the art to make and use the invention and improvements herein set forth.

In these drawings, Figure 1 is a side elevation of the machine, partly in section, partly broken away, and with certain structures, such as the nearmost elevator system, casings, etc., entirely removed, and with certain elements shown in dotted lines, all the more clearly to illustrate operative association and arrangement of details; Fig. 2 is a top plan of the machine, the steering wheels being broken away, showing frame construction, steering gear and spindle-mechanism-driving apparatus, engine, housings, etc.; Fig. 3 is a rear end view of the machine showing frame construction, engine, driving wheels and the intermeshing relationship and arrangement of spindles; Fig. 4 is a sectional top view of one of the picking mechanisms, brushing elements, conveyers, etc., substantially on the line 4—4 of Fig. 5, a fragment of the other picking mechanism being also shown, illustrating the operative relation of the spindles as seen from above; Fig. 5 is a side elevation of one of the picking mechanisms, brushing elements, driving gears and spindle controlling mechanism; Fig. 6 is a fragmentary top view of one of the rotatable picking mechanisms carrying the spindles and associated parts; Fig. 7 is a fragmentary side elevation of one of the picking mechanisms and associated parts showing its manner of mounting, spindle driving and reversing mechanism, cam element for controlling the axial movement of the spindles, etc., part of the figure being sectionally shown, the sectional view of the upper fragment being substantially on the broken line 7—7 of Fig. 6, the section of the lower portion being medial and vertical of the parts; Fig. 8 is a fragmentary side elevation of driving gears and support for some of the mechanism shown in Fig. 7, Fig. 8 being an extension of Fig. 7 but given a one-quarter turn therefrom the better to illustrate the parts; Fig. 9 is an enlarged detail of a spindle holder, spindle driving means, spindle reversing clutch mechanism and holder oscillating means, the spiral shaft being conventionally shown; Fig. 10 is a similarly enlarged fragmentary side elevation of some of the parts of Fig. 9, showing the spiral spindle driving shaft in the rear half of the spindle holder, and associated details, a part of the figure being in section; Fig. 11 is an enlarged cross sectional view on the line 11—11 of Fig. 9, showing a pair of oppositely grooved spiral spindles and the spiral gears on which they are mounted intermeshing with the spiral spindle-driving shaft; Fig. 12 is a sectional view of one of the spindle driving gears and bearings, as on the line 12—12 of Fig. 11; Fig. 13 is a top view of the cam controlling the axial directions of the spindles, and showing also means for relieving the spindles from the effect of lateral strains; Fig. 14 is a transverse vertical section of the cam element on the line 14—14 of Fig. 13; Fig. 15 is an enlarged side view of the preferred form of cotton picking spindle, only a portion of the picking structure thereon being shown; Fig. 16 is a transverse section of the same on the line 16—16 of Fig. 15; Fig. 17 is a similar view to that of Fig. 13 of a modified form of spindle; Fig. 18 is a cross sectional view of the spindle of Fig. 17 substantially on the line 18—18 of Fig. 17; Fig. 19 is a similar side view of another modified form of spindle; Fig. 20 is a sectional view of the spindle of Fig. 19 substantially on the line 20—20 of Fig. 19; Fig. 21 is a small diagrammatic side view of a tapering spindle conventionally showing spiral threads thereon; Fig. 22 (Sheet 4) is a cross section of one of the brushes proper and its holder or frame substantially on the line 22—22 of Fig. 4; and Fig. 23 (Sheet 4) is a fragmentary view in perspective showing the arrangement of tracks controlling the rotation of the picking spindles.

*The frame.*—The frame of the machine, in the preferred form illustrated, comprises two side frame structures A and B rigidly connected together at the upper portions thereof and in open spaced apart relation in the lower portions thereof. Each of these side frames is adapted to carry one of a pair of picking mechanisms and associated parts, such as a spindle cleaning device, conveyer, etc. Each of the side frames A and B comprises preferably a pair of longitudinal top frame pieces 30 and 31, connected rigidly together at their front ends by connecting pieces 32 and 33, the frame pieces 30 extending substantially the length of the machine and the frame members 31 extending substantially half way such length from the front, as shown in Fig. 2. The top pieces 30 and 31 as well as the complete side frames A and B are rigidly connected together by cross bars 34 and 35. Each of the side frames is provided with a connecting bar 36 rigid with the frame parts 30 and 31 and with the cross bar 34, and rigid with each bar 36 and the cross bar 35 is a longitudinally disposed bar 37.

Each of the side frames A and B has a lower substantially rectangular frame element comprising an outer side bar 40, an inner longitudinal bar 41, a front transverse connecting piece 42, an intermediate transverse connecting piece 42' (Fig. 4) and a rear transverse connecting piece 43, these several parts being rigidly connected together. Each side frame A and B is provided with substantially vertical connecting rods 44, 45 and 46 rigidly connected with the side frame parts 30 and 40, and between the vertical frame parts 45 and 46 bracing and supporting rods 47 and 49 are provided (Fig. 1). At the rear end of the machine, substantially vertical frame parts 50 and 51 are provided rigidly connected with the frame parts 30, 40, 47 and 49, and these frame parts 50 and 51 are rigidly connected together at the top and somewhat medially of the machine by cross bars 52 and 53 and at the bottom by the short connecting bars 43 (Fig. 3). A substantially vertically disposed rod 54 (Figs. 2 and 4) is rigid with each bottom longitudinal rod 41 (the connection being indicated in Fig. 4) and a longitudinal rod 55, the rod 55 being rigidly connected with the frame element 52 (Fig. 2). In the front of the machine and in each side frame a vertically disposed connecting piece 57 (Fig. 2) is provided rigid with the frame part 31 at the top and with the frame part 41 at the bottom, (the connection at the bottom not being shown) the frame part 41 at this point being inclined outwardly, as is well shown in Fig. 2, the front end thereof thus providing greater clearance for the cotton plants and constituting a suitable support for steering and steering wheel apparatus hereinafter described. Rigidly connecting the vertical side elements 45 (Fig. 1) and the interior vertical elements 54 (Fig. 2) is a bar 59 (Fig. 1) only the end of the bar being shown.

All of the principal frame parts mentioned are preferably made of channel iron and angle iron, which may be of comparatively small dimensions, say of 1½″ base, but other forms of metallic rods or wood may be employed, the construction of the frame being such as to provide great strength and rigidity combined with lightness therein.

In my preferred construction I employ the frame of the driving engine 70 further to strengthen the frame of the harvesting machine, the engine frame being mounted on a plurality of supports comprising transverse rods 60 connected with the vertical frame elements 50 and 51 (Fig. 3) and a longitudinal rod 61, (Fig. 1) similarly on each side frame, rigidly connected with the rod 60 (Fig. 3) and with the cross rod 59 (Fig. 1). The driving engine frame, itself being a strong and rigid structure, and thus rigidly connected, as by bolts, with frame elements in the side frames respectively, adds greatly to the rigidity of the machine. The several frame parts may be connected together by bolts or rivets or according to any other well known manner of forming rigid connections between such parts.

*Propelling mechanism.*—A source of power 70, preferably an internal combustion engine, and which I have illustrated as of the opposed cylinder type, is rigidly mounted, as hereinabove specified, preferably in the rear and upper portion of the frame, and provides driving means for moving the machine forward or rearward upon the ground, and also for driving the cotton picking mechanisms and their associated parts. A longitudinally arranged driving shaft 71 journaled in a bearing 72 (Fig. 1) mounted in the frame carries the transmission element or clutch 73. This transmission device 73 may be of any approved type, and is adapted as a clutch to rotate the pinion 74 and which pinion is rigid with one element of the transmission or clutch (through which the engine shaft 71 rotates) as the shaft 71 rotates, and to break the operative or driving connection between the shaft 71 and pinion 74. As a selective speed and reversing transmission, (the element 73 illustrated being of the planetary type) the direction of rotation of the pinion 74 may be reversed or its speed of rotation altered. Such planetary type of transmission is well known and requires no detailed description, nor have I illustrated suitable levers for operating the same to provide such reverse direction or change of speed, such parts being similarly well known.

The pinion 74 on the transmission device 73 is arranged to intermesh with the gear 75 rigid on the longitudinally disposed shaft 76, which is suitably mounted in bearings 77 and 78 on suitable cross bars secured to the two rods 61. On the front end of the shaft 76 is rigidly secured a bevel gear 79 arranged to intermesh with a similar gear 80 (carrying differential mechanism in the part thereof marked 80'), on the transverse shaft 81 suitably pivoted in bearings 82 secured upon the upright frame elements 54 (Fig. 2) respectively. On each end of the shaft 81 is a sprocket wheel 83 on which travels the endless chain 84, which is also arranged to travel upon the large sprocket wheel 85 rigid upon the driving wheel 86. Each driving wheel 86 on its axle 87 is adjustably mounted at its outer and inner ends respectively through the projection of the axle into supporting engagement with the sides of an arcuate slot 88 in a wheel supporting frame element 89 rigidly connected with the rods 90 and 91 which are in turn rigid upon the frame of the machine as upon the bars 46 and 47. The arc of the slot 88 has its center at the shaft 81, by which arrangement the rear end of the machine may be raised or lowered with respect to the ground without altering the tension of the chain 84. Means 92 are provided for moving the wheel shaft and its projection 87 in the arcuate slot 88, the details of which are not shown or described as such means in association with wheels is well known, although I am not aware that the arcuate arrangement of the slot 88 is not new. A system of levers 93—93' operatively connected with the clutch or transmission device 73 and terminating in a controlling lever 94 is shown conventionally and in dotted lines for clearness of illustration. From the foregoing it will be apparent that when the handle 94 is operated the clutch 73 will be thrown into or out of connection with the shaft 71 whereby rotative motion will be communicated to the driving wheel 86 or such motion terminated.

*Power transmission for cotton picking mechanism.*—Upon the engine shaft 71 is mounted a clutch 95 from which extends a system of levers 96—96' terminating in controlling lever 97 whereby the clutch may be made to rotate the short shaft 98 rigid with one element of the clutch, the shaft 98 being journaled at 99 and carrying on its front end the bevel gear 100 adapted to intermesh with a somewhat larger bevel gear 101 rigid on the transverse shaft 102 in bearings 103 on the side frames 30. The shaft 102 is the driving shaft for the cotton picking mechanisms and associated parts on each side of the machine, and a description of the operative elements on one side will suffice for both.

By reference to Fig. 2 it will be noted that the shaft 102 carries a bevel gear 104 arranged to intermesh with a similar gear 105. From Fig. 5 it will more clearly appear that the gear 105 is secured upon the hexagonal shaft 106 mounted to rotate in suitable bearings 107 and 107', only the upper end of each of said bearings being shown, the shaft being suitably rounded at the bearing portions. The shaft 106 carries a rigidly mounted gear wheel 108 intermeshing with a gear 109 of the same size on a rotatable shaft 110 in bearings 111 and 111' suitably mounted upon the frame of the machine. The gear 109 is rigid with and may be integral with the smaller gear 113 adapted to intermesh with a larger gear 114 mounted on the rotatable shaft 115 in bearings 112 and 112', said shaft 115 also carrying a smaller gear 116. This gear intermeshes with the large gear 117 which is rigidly connected with a drum or casing 118, which casing contains and carries certain operative mechanisms for rotating the spindles and changing their direction of rotation, etc., as hereinafter more fully described. It will thus be seen that when the clutch 95 is operated so as to rotate the bevel gear 100, axial with the engine shaft, the casing 118 and its connected parts will be rotated about the shaft 119 upon which this casing is loosely mounted. The driving gear 117 on one mechanism intermeshes with the gear 117 on the other (Fig. 2) insuring proper and positive coöperative relative movement of the two cotton picking mechanisms when the machine is in use. The train of gears and connections just described is the same on both sides of the machine, the housing $h$ of the cotton picking mechanism on the side frame B being removed to show some of the parts.

*The spindle driving mechanism.*—The casing 118 is provided (as part of the same) with a cover 120 (see Fig. 7) having a depending flange adapted to fit over the upper edges of the casing 118 and to be secured thereon as by machine bolts 121. This cover 120 is preferably a casting, as is the rest of the casing, and is provided with a centrally positioned stem or projection 122, which is hollow and constitutes a bearing for a hollow shaft 123, the upper end of the shaft 123 having rigidly secured thereto a bevel pinion 124. Within the hollow shaft 123 is rotatably positioned the shaft 119, the hollow shaft 123 constituting a bearing for the shaft 119. Upon the upper end of the shaft 119 is rigidly secured the bevel gear 126. Intermeshing with both gears 126 and 124 is a bevel gear 127 rigid upon the end of the shaft 128, which shaft 128 has its front end pivoted in a support 129 rigid upon the frame element 31, which support also constitutes a bearing for the shaft 119. It will be obvious that when the bevel gear 127 is rotated the intermeshing gears 124 and 126 will simultaneously be rotated in opposite directions. The gear 127 is rotated through the medium of a pinion 130 (Fig. 2) intermeshing with the pinion 131 rigidly mounted on the shaft 102.

Within the casing 118 and upon the end of the hollow shaft 123 is rigidly secured, preferably by threading the shaft directly thereinto, a gear wheel 135, and also within the casing and on the shaft 119 is rigidly secured, as by a key 136, a gear wheel 137, preferably of the size of gear 135. These gears 135 and 137 are the driving gears for rotating in clockwise and anticlockwise direction the spindle driving shafts 140. Within the casing 118 and upon each of the shafts 140 is rigidly secured, as by a cross-pin, a clutch-like element 141, which is formed preferably of a casting having a bore suitable for fitting the same upon the shaft and a circular outstanding centrally arranged flange, the tapering truncated-cone portion of the clutch element 141 shown in the drawings being preferably of leather, wood or similar softer material. The construction is well illustrated in the sectional view of Fig. 7.

Within the casing 118 and loosely mounted on each of the shafts 140 are positioned two gears 143 and 144 respectively intermeshing with the gears 135 and 137, and each thereof being provided integral therewith or rigidly secured thereto a cup-like friction element 145 and 146 respectively, these cup shaped elements being directed toward the friction element 141 and positioned with respect thereto so that when the shaft 140 is slightly raised, the friction element 141 will come into engagement with the cup-shaped element 145, thereby rotating the shaft 140 in one direction, and when the shaft 140 is lowered slightly, similar contact is made with the cup-shaped friction element 146 and the shaft is rotated in the opposite direction. As each of the shafts 140 is provided with the same devices for rotating the same and as all of the gears 143 and 144 are at all times in mesh with the driving gears 135 and 137 it is apparent that such of the shafts 140 will simultaneously be rotated in one direction or the other as have their friction elements 141 respectively in contact with one or the other of the elements 145 and 146. The arrangement is such that resistance offered to the rotation of the shaft 140, as work being done by or upon the spindles, will force the friction element 141 more tightly into engagement with either cup-shaped element 145 or 146 through the threading action of the spirals on the shaft 140, such threading action tending to cause the shaft to move longitudinally, the spiral gears 200 acting as relatively fixed female members for the male threaded element 140. The device thus automatically takes care of sudden or additional strains. These shafts 140 may be maintained in a rotative or non-rotative state at any particular time or period in their course of travel by a suitable arrangement of the spindle raising and lowering means, hereinafter described, thus saving power, as, for instance should it be desirable to have the spindles non-rotative during the cleaning operation, according to the specific type or kind of picking spindle employed. In the present specification I have illustrated and described the device so constructed that the picking spindles are rotated in one direction during the picking operation and in the other direction during the cleaning operation, with a period of rest when the directions are changed from one to the other.

Each of the shafts 140 is provided at its upper end with a reduced portion 150 providing an annular groove and upon the end of the shaft is secured the connection or coupling element 151 having an interior annular projection 152 extending into the groove 150, the shaft 140 being mounted to rotate freely in the element 151. The lever arm 153 has its one end pivoted in the connection element 151 by a pin 153' its other end being rigid upon the shaft 154 mounted to rock in upwardly projecting annular flanges 155 and 156 upon the cover 120 of the casing 118. On the outer end of the shaft 154 is rigidly secured the lever 157 having thereon the friction roller 158. In Fig. 5 means are illustrated for vertically moving the friction rollers 157, and consequently raising and lowering the shafts 140 respectively whereby the friction element 141 is brought into driving contact with the cone-like clutch elements 145 or 146 or maintained in spaced relation to each thereof. These means comprise two tracks 160 and 161 (see Fig. 23) each substantially a half circle in length and formed conveniently of angle iron, the horizontal leg constituting the track or surface on which the rollers 158 travel. The track 160 is adapted to elevate the friction rollers 158 as they come successively into contact with the inclined initial portion 162 of the track 160, the rollers riding upward and consequently depressing the friction element 141, the track 160 maintaining the element 141 so depressed as long as it is desired to rotate the shaft 140 in the cotton picking operation. The track 161 has its track surface 161ᵃ (shown by a dotted line, Fig. 5) on a lower plane than that of the track 160 and the friction rollers 158 are adapted to travel on the underside of the track 161 (see dotted lines Fig. 5) instead of on the top side as in the case of the track 160, the arrangement being such that as the rollers pass from the track 160 by way of a declining guide 161ᵇ (Fig. 23) to the track 161 they are forced downward, thereby raising the friction element 141 into engagement with the cone-like element 145 and causing the spindles to rotate in the opposite direction, which is during the spindle-cleaning operation. The track 160 is held in its desired position by supports 165 and 166 having adjusting nuts 167 and 168 thereon and helical springs 169 and 170 respectively whereby the desired amount of frictional contact between the friction elements 141 and 146 may be maintained by suitable spring pressure. A supporting element 171 rigid with the track 160 is adjustably secured to the frame of the machine. A similar spring device is provided for the track 160, comprising the supporting member 172, the adjusting nut 173 and the spring 174, and the track is otherwise suitably sustained by braces or rods, as 171'.

*Spindle mounting and oscillating mechanism.*—In the preferred construction a plurality of spindles S are rotatably mounted in a spindle mounting or support 175 and projecting therefrom substantially horizontally, the spindles being preferably arranged in horizontal pairs as is well illustrated in the drawings. A plurality of such spindle holders 175 are mounted, preferably on a substantially circular line, upon a carrier plate 176 which is suitably rotatably mounted, as on the shaft 177. The shaft 177 is axial with the shaft 119 and is made rigid upon the casing 118 by a pin or bolt 178 through a boss or projection 118' on the casing 118. The shaft 119 has its lower end pivoted in the hollow projection 118' and between the shafts 119 and 177 are friction balls 179, the shaft 177 thus communicating the weight of the casing and associated parts to its end thrust bearing 180 in the fixed cam element 181. The plate 176 is rigidly secured to the shaft 177 as by the pin or rivet 182 through the flange or coupling 183 removably secured by bolts 184 to the plate or carrier 176.

Each of the spindle holders 175 comprises preferably a back portion 175ᵃ and a front portion 175ᵇ, these two portions being secured one upon the other by suitable means, such as the screw bolts 185. The lower portions of the holders 175 respectively are provided with a suitable reduced portion or projection 186 adapted to pass operatively through a hole 187 in the carrier plate 176 whereby the spindle holders respectively may oscillate or rock pivotally therein or thereupon. Upon the projecting end 186 of the spindle carriers 175 respectively, a crank arm 188 is rigidly secured, as by the through pin 189, and upon each of such crank arms there is provided a friction roller 190 adapted to travel in the irregular track 191 of the cam element 181 rigidly secured to the frame of the machine as upon the supports 192 and 193.

The spindle holders 175 are longitudinally hollowed interiorly to provide clearance for the shaft 140, which is provided on its periphery with a spiral ridge 194, or preferably with a plurality of such ridges, side by side, to provide the desired pitch and proportions for suitable driving results, such number of spiral ridges being practically employed by me as provides substantially a 45 degree angle of thread. Such spiral cutting preferably extends substantially throughout that portion of the shaft 140 as is within the spindle holders 175, the lower portion, however, as 195, being left smooth and circular in cross section to provide an end pivot for the shaft, which pivot is adapted to rotate in a suitable recess 196 in the holder 175, this recess having a clearance beneath the end of the shaft to permit the shaft to be moved vertically when in operative position with respect to the carrier holder containing the same. In the upper portion of the spindle holders or supports 175 the bearings 197 and 198 are provided in the casing 118 and cover 120 respectively. Worm gears 200 are mounted on either side of the shaft 140 in recesses 200ª and 200ᵇ of the casing parts respectively, and their operative association with the shaft is well shown in Figs. 10 and 11, from which it will be observed that these gears 200 are respectively mounted in suitable end casings 201 provided with ball bearings and that a cotton picking spindle S is positively connected to each of the gears, as by a cotter pin 202 so that each gear and spindle will have a common axis of rotation. As each spindle is connected with one of the gears 200 intermeshing with the spiral shaft 140, it will be seen that when the shaft 140 is rotated each of the spindles on that spindle holder will be rotated on its own axis. It will be observed further that the spindles on one side of the shaft will be rotated in a clockwise direction and those on the other side in an anticlockwise direction. The upper end of each of the spindle holders 175 is pivotally mounted in the lower portion of the gear casing 118 by means of a bushing-like collar 203 secured to the spindle holder, projecting slightly therefrom, and acting also as a bearing for the shaft 140.

From the construction shown and described it will be apparent that when the friction roller 190 on each of the spindle holders 175 is traveling in the cam groove 191, a rocking or oscillating motion will be imparted to the spindle holders respectively, and that since the cam element 181 is relatively fixed by being rigid with the frame the spindle holders 175 will respectively and successively assume the same relative position or attitude at any given point in their travel about their common axis of revolution, namely the shaft 177. That is to say, at any given place in such course of travel, say for instance at the place marked 252 on Fig. 4, each of the holders, and consequently each of the spindles on the holders respectively will successively assume the position of the holder and spindles illustrated at that place. This cam track 191 is so designed and positioned that spindle carriers are successively being turned more and more with their faces toward the row of cotton as they are approaching the cotton picking position until the spindles carried thereby respectively are positioned substantially at right angles to the row. The arrangement is further such that when the spindles in any one of the spindle carriers 175 are thus substantially at right angles with the row and substantially parallel with the oppositely disposed spindles on the other picking mechanism, they are maintained in such relation until the further rotation of the carrier plate 176 carries the spindle holders respectively substantially out of their cotton picking relationship with the row, at which time the supports or carriers 175 are turned through a considerable arc on their own axes respectively until the spindles approach the brushing or cleaning devices, when they are pointing toward the brushes, and when they are passing through the cleaning devices respectively they are maintained in substantially a given axial direction with respect to the cleaning device, similar to their action during the picking operation. In the employment of some forms of cleaning devices which may be found suitable it may be desirable to provide that the spindles shall have different angles of contact with the brushes or different angles with respect to the row of plants than in the preferred arrangement shown, and all such changes and variations may be provided, within suitable limits, by varying the design of the cam track 191 which controls the result.

*The spindle cleaning mechanism.*—The spindle cleaning mechanism in its preferred form and arrangement comprises a pair of independently mounted brushing elements 210–210ª, there preferably being a plurality of such elements mounted in superposed relation upon each of two shafts 211 and 212 (Fig. 1), which may suitably be hexagonal in form, each brushing element carrying preferably three brushes proper 213, the brushing elements 210 being preferably provided with suitable recesses 214 or with means as 215 forming guideways whereby the brushes proper may be inserted therein and withdrawn therefrom at will, thus providing an interchangeable feature valuable for repair or the replacement of brushes as they become worn. Each brush proper is preferably arranged with its longitudinal direction intersecting a radial line from the axis of rotation of the brushing element, such radial line, as z, being considered as on the plane of rotation, and this for the important function of not only preventing the brushes proper from flying out of their respective channels 214 containing the same due to centrifugal force but also in order that they may engage the spindles in such manner as to begin a forward brushing operation—that is toward the point of the spindle—at substantially the time the brush first contacts the advancing spindle, and then to continue a forward and laterally cotton unwinding operation until the point of the spindle is reached, at which time the brush proper is substantially at right angles to the axial line of the spindle and the cotton brushed therefrom is thrown away from the spindle and from the brush. This feature is important also in holding the brush proper in operative position on the brushing element due to the pressure constantly being exerted upon it in a direction more or less toward the axis of its revolution, the channel or guideway 214 having a suitable stop for the brush at its inner end. As shown in the drawings these brushing elements 210 have portions thereof cut away between the brushes proper, the two axes 211 and 212 on which the two sets or batteries of brushes are respectively mounted being so spaced from each other that the brushes proper and their supporting means may have free rotation due to the cog-like intermeshing of brushing elements on the same plane—such brushing elements however not contacting but suitably clearing each other as they respectively rotate. On each of the driving shafts 211 and 212 the brushing elements 210 are superimposed alternately in staggered relation; that is, the alternate brushes on the same shaft as 211 are given a one-sixth or 60° turn, which arrangement permits the coöperating brushes as $x$—$x'$, not in the same plane, simultaneously to act upon any given spindle traveling in a plane between the two. It is to be understood in general that the coöperating brushing elements on the two shafts 211 and 212 are not in the same plane, the brushing elements on the shaft 211 having their brushes proper turned upward while the brushes proper carried by the brushing elements on the shaft 212 are positioned downward, the brushes carried by the shaft 212 sweeping the top portions of the spindles and those on the shaft 211 sweeping the bottom portions thereof, the spindles traveling sidewise between the upstanding brushes on one side and the downwardly projected brushes on the other side. In practice the brushing elements on both shafts move toward each other on the side of the picking mechanism, the shaft 211 rotating in a clockwise direction and the shaft 212 in an anticlockwise direction as viewed from the top. As the coöperating brushes as $x$—$x'$ are in overlapped relation to each other through part of their travel, and both are moving toward the point of the spindle, the action of the brushes proper is such that the cotton on the spindle is simultaneously unwound and swept toward the outer end of the spindle and when carried beyond the spindle and yet between the brushes is acted upon equally by the two brushes and with a simultaneous movement thereby is thrown away from the brushing device. The clearance between the brushes proper is important from the standpoint of allowing escape for the cotton thereon. The arrangement is important also from the standpoint of cleaning the brushes themselves of cotton, and, importantly, from preventing cotton from becoming wound about the axes of the brushes respectively. This advantage is had in the provision of brushing elements on one axis reaching well in toward the axis of the other brushing element and sweeping outward the cotton tending to collect upon the brushes proper and about the axes respectively. The brush elements 216 of the brushes proper are preferably of steel bristles, which material provides suitable strength and resiliency, and in the arrangement shown a thorough cleaning from the spindles of the cotton adhering thereto is secured, even when gumminess may be present on the spindles due to exudation of sticky matter from the plant.

The shafts 211 and 212 are mounted to rotate in respective end thrust bearings 220 (Fig. 5) rigidly secured as by supports 220' to the supporting bar 220ᵃ carried by the frame of the machine. A ball bearing is suitably employed in this connection, as illustrated, and an adjusting screw 221 substantially axial with the shaft by which each shaft may be raised or lowered slightly as when it may be desired to adjust the brushing elements thereon to take up wear of the brushes proper. These brushing elements 210 may be individually secured to their shafts by means of set screws as 217 or merely the lowermost brushing element on each shaft may be so secured, the latter construction being preferable to avoid projections such as screw heads, which may collect particles of cotton.

The shafts 211 and 212 (see Fig. 5) are not integral with shafts 106 and 110 respectively although axial therewith and rotated thereby. For purposes of assembling and removal of parts these alined shafts are drivingly connected together respectively by a sleeve 222 having a hexagonal interior fitting each adjacent end portion of the hexagonal shafts 211 and 106 or 212 and 110, the sleeve 222 being secured to the shaft 211 and 106 or 212 and 110 by set screws as 223. By loosening the screws 223 the sleeve may be raised or lowered beyond the joint between the adjacent shafts. A clearance 224 is provided between these shafts for adjustment of the lower shaft as already mentioned.

The supporting bar 220ᵃ, (Fig. 5) carrying the cleaning device supports 220' is hingedly mounted as at 220ᵇ to the frame part 10, and this supporting bar 220ᵃ is secured by the bolt 220ᶜ whereby the cleaning devices are maintained in operative position with respect to the cotton picking devices during the cotton picking and spindle cleaning operation. A similar supporting bar 220ᵈ hinged as at 220ᵉ, and having a similar locking bolt 220ᶠ carries supporting elements similar to the brackets 220' adapted to support the upper end portions of the shafts 211 and 212. These upper brackets secured to the supporting bar 220ᵈ are not shown and are not strictly necessary but may be employed to steady the upper ends of the shafts 211 and 212 when these shafts are disconnected from the shafts 106 and 110 respectively. By removing the bolts 220ᶜ and 220ᶠ and moving the sleeves 222 the bars 220ᵃ and 220ᵈ may be swung outwardly carrying the cleaning mechanisms with them, or with the lower one, whereby access may be had to the cleaning mechanisms themselves, the interior of the spindle cleaning chamber and to the picking mechanism or parts of the cotton conveying mechanisms, etc., as for cleaning, adjustment and repair.

*Cotton plant guides and spindle guards.—* A plurality of loop-shaped preferably flat rods 250 are rigidly connected at the front of the machine to the vertical angle irons or frame supports 57 at one of their ends and to the substantially vertical angle iron or support 57ᵃ at the other of their ends respectively. These loop shaped band-like elements 250 respectively pass around a large portion of each of the cleaning mechanisms, and are positioned between the planes of revolution of vertically adjacent spindles whereby the spindles mounted to revolve in the same plane will extend into and travel through a substantially parallel-sided slot-like opening 251 between adjacent of these loop-like rods or bars. It is to be understood that this loop construction is not strictly essential but that the important feature is the provision of such intervening bars on the picking side of the mechanism, and preferably on both the picking and cleaning side thereof. These loop-shaped elements 250 constitute guides which contact outwardly extending branches and portions of the plant and force them into proper relation with the picking spindles as the machine travels upon the ground. The portion of the elements 250 on the plant side of the picking mechanisms respectively also prevents branches, foliage and cotton bolls from objectionably coming into contact with the mounted end of the spindle (likely to have grease upon it), and also from the rocking spindle-carriers 175, which might obstruct the free operation of the machine or take hold of the plant and injure it. It will be observed that the elements 250 are preferably given a quarter turn, as at 252, in their forward portion by which greater space is there provided between two vertically adjacent of such elements, thus insuring the safe entry into the space 251 of a slightly bent or loosely mounted spindle.

On each of the guide and protecting elements 250 is a brace or support 253 rigid with the frame, as upon the vertical element 54 thereof. This support 253 is preferably of flat metal and is positioned flatwise horizontally to provide greater clearance for the spindles which at the time of their passage between vertically adjacent thereof are laden with cotton. In practice I have found that the slot-like opening between vertically adjacent elements 253 may be suitably about one and one-eighth inches, and that the space between the vertically adjacent elements 250 may suitably be seven-sixteenths of an inch when a three-eighth inch spindle is employed. Where a quarter inch spindle or one of any other suitable diameter is used these spaces should be varied accordingly or suitably, the relative dimensions and clearances shown, however, being found by me to give good results.

On the brushing or cleaning side of the cotton picking mechanisms respectively the elements 250 are suitably bent, as at 254 not only to give rotative clearance for the brushing elements 210ᵃ but to serve the additional function of assisting in the removal of cotton which may be near the mounted end of the spindles respectively and not strongly enough engaged by the brushes at such portion to remove the same. The spindles are retreating or drawing away from the brushing elements at about this point 254, and as the cotton may not pass through the slot between the elements 250 at this point but is held by the close fitting of the elements 250 with the spindle, the spindles release themselves from the cotton owing to the spiral threads thereon now turning in an unscrewing direction. This affords the brushing elements 210ᵃ further opportunity to engage such unwound and free cotton and discharge the same as desired; but should it happen that the brushing element 210ᵃ does not succeed in removing partially unwound and freed cotton substantially at the point 254 such cotton (passing through the widened slot beyond the place 254) travels with the spindle again through the cotton picking operation, but having been forced somewhat toward the point of the spindle through the scraping, holding and unwinding coaction of the spindle and the elements 250 at the place 254, it is in position to be operated upon positively by the brushing elements when it again comes into association therewith. In so important a function of a cotton picking machine as the removal of the cotton from the spindles, this feature of the device is of value. The space between the vertically adjacent elements 250 at the point 254, as well as at the other portions thereof in association with the brushing elements is preferably substantially that of the space between the same elements on the cotton picking side.

*Conveyers, bag holders, etc.*—Horizontally disposed beneath the batteries of brushing elements 210 is an endless belt conveyer 265 mounted to travel upon preferably wooden rollers 266 and 267 having their end bearing pivots mounted respectively in the frame elements 40 and 40ª in substantially the same horizontal plane, as shown in Fig. 4. This belt conveyer may suitably be of canvas and is provided with upstanding projections 268, of wood or other suitable and preferably light material, and adapted to carry the cotton toward the rear of the machine. A vertically disposed endless belt conveyer 269, of similar material, is positioned rearward of the conveyer 265, the conveyer 269 having outstanding spikes, spines or pins 270 adapted to engage the cotton carried to them by the conveyer 265. The vertical conveyer 269 is mounted to travel upon preferably wooden rollers 271 and 272 suitably mounted in a metallic or wooden casing 273 open at its bottom to permit the cotton from the conveyer 265 to come in contact with the conveyer 269. A third conveyer 274 is positioned at the top of the machine adapted to take the cotton from the conveyer 269 and carry it to the rear end of the machine. The rear roller 275 of the conveyer 274 is mounted to rotate in the casing 276, while the forward roller 277 is mounted upon bearings carried by the casing 273, these two rollers 272 and 277 therefore having a fixed relative position with respect to each other. At the rear of the machine is rigidly connected a slotted support 278 for the rear end of the casing 276 whereby such rear end may be raised or lowered, relatively to the support as will readily be understood from Fig. 1. The front end of the casing 276 loosely overlaps the casing 273, thus permitting some movement between the two casings at this point when the rear end of the casing 276 is raised or lowered. The provision of adjustment for the casing 276 is made in view of the use of bags or receptacles 279 (Fig. 2) of different lengths used in collecting the picked cotton, and the downwardly turned end of the casing 276 is provided on opposite sides thereof with bag holding devices 280. As shown in the drawings these bag holding devices 280 consist of light angle iron having one leg or flange cut at intervals and the iron then bent in an arc. The bag holding elements are so formed and arranged in pairs that a bag may be hooked upon or brought into engagement with the projection 281 of the casing, drawn over the arms or holders 280 and be held thereon by the teeth-like projections 282 springingly held in contact with the bag.

Conveying motion is imparted to all of the conveyers through a driving chain 284 (Figs. 1 and 2) traveling upon a sprocket wheel 285 (Fig. 1) on the shaft 128, and simultaneously upon sprockets 286 and 287 on the rollers 273 and 277 respectively. At the bottom of the machine sprockets 288 and 289 are mounted on the rollers 271 and 267 respectively and the chain 290 positioned operatively thereon. It will thus be seen that cotton upon the top of the conveyer 265 will be carried against the front of the conveyer 269 which in turn conveys the same to the top of the conveyer 274 whence it is discharged into the bag 279.

The description hereinabove made of one system of conveyers and associated parts is applicable to the system on the other side of the machine.

The brushing elements 210 are positioned in a cotton collecting casing having suitable walls 291 and 292 and one end wall 293, the casing 273 and the vertical conveyer 269 acting as the other end wall, the side wall 291 being bent back as at 294 to give clearance for the spindles S. The wall 292 is provided with a screen 292' therein, such as wire netting, adapted to permit foreign matter, such as sand, portions of leaves, twigs, bark, etc., (which may happen to adhere to the cotton when being picked) to pass therethrough and out of the machine, thus partially cleaning the cotton before it is carried into the bags. The brushing elements 210 throw the cotton and such foreign particles with considerable force in the direction of the screen and also produce a distinct air current in the same direction. In this connection it is mentioned that heavier foreign matter such as bolts or nuts or broken spindles or the like which may happen to find their way upon the conveyer 265 pass out of the machine at the end of said conveyer, there being sufficient clearance between the conveyers 265 and 269 therefor. If it should happen that any such heavier matter is carried by the vertical conveyer, another opportunity for its escape is given between the contiguous conveyer rollers at the top of the machine.

*Steering mechanism.*—In the forward end of each of the side frames A and B and rigidly secured to the connecting elements 32 and 33, as by bolts, is a block or support 300, and substantially vertically beneath it rigidly connected (as by bolts) to the frame member 41 is a bearing element 301. The block 300 may constitute a bearing, but I preferably provide an adjustable bearing element 302 therein, of tubular form, having a hollow interior and provided with screw threads on its outer periphery, the block 300 having a vertical aperture provided with corresponding threads, whereby the bearing element 302 may be adjustably moved with respect to its supporting frame. A rod-like wheel-support 303 is arranged to move vertically in the bearing elements 301 and 302, the parts being considered in their operative positions. Rigid upon the wheel support 303 is a mounting 304 from which projects substantially horizontally the stud shaft 305, the steering wheel 306 being mounted to rotate on this shaft. Also rigid upon the wheel support 303 is a spring stop or rest 307 and operatively between this spring stop and the bearing element 302 is a spring element 308, which is preferably in the form of a helical spring surrounding the rod-like support 303. The element 302 is thus not only a bearing but also an adjustable spring stop, and constitutes means by which the front end of the machine may be raised or lowered with respect to the ground when the wheel 306 is resting thereon. From the wheel support 303, and suitably from the spring stop 307, there extends an arm 309.

The description of the steering mechanism thus far made is equally applicable to that associated with the steering wheels on either side of the machine. The cross rod 310 is pivotally connected to each of the arms 309, and on an extension 311 on one of the arms 309, a ball and socket coupling 312 is mounted, to which coupling is connected the transverse rod 313. On the other end of the rod 313 is a universal coupling 314, and also connected to this universal coupling is the lever arm 315, the universal coupling permitting the rod 313 to move laterally as well as to have a pivotal action with respect to the rod 315, the arrangement shown thus compensating for variations in the relative vertical positions of the wheels with respect to the frame, as when one front wheel rises upon an obstruction upon the ground. The arm 315 is rigid with a worm gear 316 on the shaft 317, the shaft 317 being integral with the arm 315 and is mounted to rock in the top cross bar 34. In intermeshing association with the gear 316 is the worm 318 (shown in dotted lines) upon the steering rod 319, this steering rod being pivoted at its front end in the frame part 34 and intermediate its ends in the frame part 56. A hand wheel 320 is rigid upon the shaft 319 and is positioned immediately in front of the operator's seat or station 321. It will thus be noted that when the steering handle 320 is turned in clockwise or anticlockwise direction motion will be communicated to the cross rod 310, which transmits the same equally to the rods 309 and thus both steering wheels 306 are pointed in the same direction and their traveling direction simultaneously varied as desired.

*The spindle.*—The cotton picking spindle preferably employed by me in the present form of machine consists of a rod, which may be tapering, but is preferably of cylindrical form as chiefly illustrated. The spindle contains a spiral groove, on its periphery, and preferably a plurality of such spiral grooves substantially parallel with each other and extending from the point of the spindle throughout that portion of the same which is exposed to the plants during the cotton picking operation.

The preferred form of spindle is shown in Fig. 15 in which three spiral grooves 330 are cut in the spindle body, presenting intervening ridges 331 having substantially the structure of a screw thread, but having considerable pitch. In the preferred form several, say three, longitudinal grooves 332 are cut transversely of the threads, such longitudinal cutting presenting preferably a slightly undercut transverse face, as 333, to the several threads where the longitudinal groove is made, such groove being deepest at such undercut faces and gradually slanting away therefrom until the top surface of the ridges is reached, as at 334. These undercut faces terminate in sharp points 335, and when the spindle is rotated in picking position with such triangular faces moving forward, that is, in such manner that these faces will be presented to the cotton fibers, the fibers are caught and wound upon the spindle. Inasmuch as I am employing spindles some of which rotate in one and others in the opposite direction I provide spindles having right and left grooves and ridges respectively and the undercut faces mentioned are also reversed on some of them so that the same cotton picking action will be had by the spindles having the right and the left construction respectively when operated respectively in clockwise and anticlockwise direction.

In Fig. 17 I have shown a modified form of spindle in which I employ a spiral thread construction 340 similar to that shown in Fig. 15, but in which the longitudinal grooves 341 providing the picking facets or points 342 are themselves spirally arranged, in which construction in every position of the spindle on its axis, a plurality of picking facets or points 342 are presented to any given plane at the spindle's side.

In Fig. 19 I have illustrated a spindle having a plurality of spiral, preferably undercut, grooves 345 providing spiral ridges 346, and in the faces of these ridges respectively where they are so undercut I provide somewhat sharp points 347, similar to saw teeth, but not necessarily so distinct, these small teeth providing a large number of angular projections from the main body of the ridge adapted to catch the cotton fibers and wind the same upon the spindle. The spiral construction illustrated and described is highly advantageous both in picking the cotton and in freeing the spindle therefrom, the tendency and actual result in picking being to wind the cotton spirally upon the spindle, and especially where the movement of the spindle is first forward into the cotton plants. A very notable advantage however is had when the direction of the spindle is reversed in cleaning, when the spiral construction causes the spindle substantially to unscrew itself from the cotton, the cotton being held by the cleaning brushes, the picking facets or points receding from the cotton fibers, and no holding action being had by the spiral ridges except some slight incidental friction which is not sufficient to prevent the ready removal of the cotton therefrom. A particular advantage is had in the fact that the cotton fibers are not materially torn in either the picking or unwinding operation, the cotton coming from the brushes in a substantially natural condition; that is, not in a twisted, curled or tightly bunched mass, but being free and open.

Reference is made to my copending application, Serial No. 856,000, filed August 10, 1914, entitled "Cotton picking spindles," wherein I claim the subject matter of the spindles hereinabove described.

*Further provisions.*—While it is feasible to gather cotton from the plants with only one of the rotatable cotton picking mechanisms shown and described, as by passing the machine first on one side of the row and then on the other, I preferably employ two such cotton picking mechanisms, as already pointed out, and in such spaced apart relation that the machine may be caused to travel with a row of cotton plants between such cotton picking mechanisms, which mechanisms in my preferred construction are the same in all material and substantial respects and any description of one is applicable to the other.

When in cotton picking position the spindles of one of the mechanisms preferably overlap to a considerable extent those of the other mechanism, these oppositely disposed spindles thereby intermeshing in a sense, although they are suitably spaced apart and do not contact each other at any time. The spindles of any given horizontal row thereof on one of the mechanisms (except the uppermost or lowermost row) are normally on a plane of revolution substantially medial of the planes of revolution of the spindles of the next upper and lower rows on the other mechanism and the vertically corresponding rows of spindles on each mechanism are also in spaced apart planes when the spindles are in picking position.

In practice I preferably arrange the spindles on each of the spindle holders 175 about one and one-half inches apart in the normally vertical direction for use in picking cotton from time to time during the season, when it is important not to injure the plant; but for making a thorough gleaning of the cotton, as on the last harvesting when the injury to immature bolls is no longer to be considered, I substitute in the machine spindle holders in which the spindles are about one and one-fourth inches apart. The machine is thus adapted to garner substantially all of the cotton suitable for picking which may be found upon the plants. I have, however, obtained excellent results with the spindles spaced considerably farther apart.

It will be observed from the several figures that the rotatable cleaning mechanisms on either side of the machine extend somewhat into the space defined generally by the side frames A and B, thus bringing the two cleaning mechanisms so close together that the projecting and substantially intermeshing spindles on each thereof will respectively enter deeply into the foliage, etc., of the plants, and also, and importantly, in order that the spindles mounted on a plurality of spindle holders 175 will be at the same time in cotton picking relation to the row. As will be observed in the preferred construction the spindles projecting from three of the spindle holders 175 on each side of the machine are at all times in such cotton picking position, and thus any given spindle is maintained in cotton picking relation to the plants for a considerable period, the oppositely disposed spindles moving generally toward and from each other the while, thus providing the spindles and the machine with a distinct and highly advantageous feature.

As the machine is moving forward upon the ground the oppositely disposed spindles of each of the picking mechanisms are moving backward relative to the machine itself substantially throughout the cotton picking position at substantially the same speed as the machine as a whole moves forward, and thus the spindles positioned among the foliage and bolls are substantially in a fixed position with respect to the ground during such time, the spindles rotating on their own axes the while and gathering the cotton wherever so much as a fiber or two of the same happens to come in contact with one of the spindles. Through the provision of means which maintain the spindles at substantially right angles to the row, or means which maintain the spindles from the opposite mechanisms substantially parallel with each other throughout substantially the cotton picking process, the danger of mishap due to the contacting of spindles one with another is avoided; but this provision is particularly advantageous in maintaining the spindles in suitable picking relation to the plants throughout a considerable period and without lateral pushing or forcing of the plants in any direction, thus saving the plant by avoiding the stripping therefrom of foliage, branches or bolls not yet matured. In this connection it is pointed out that owing to the fact that the spindles on one mechanism are higher than those corresponding thereto on the other mechanism, it is possible to provide fresh and unused portions of the spiral spindle-driving elements 140 throughout the entire machine when wear thereof renders a change desirable; and this may be done by merely shifting the spindle holders 175 from one mechanism to the other, but retaining on each mechanism the spiral spindle-driving elements 140 and their associated gears 200 and spindles respectively. While the higher and lower relative position of the spindles is thus changed from one side of the machine to the other, the proper working relationship of the spindles to each other is maintained as before; and since the variation of the spindles in elevation is due merely to the positioning of the spindles in the holders 175, it is apparent that the spiral elements 140, being journaled the same as before, now intermesh with the worm gears 200 at a hitherto unused portion thereof. It is here pointed out that the spiral shafts 140 in the holders on one picking mechanism preferably have their driving spiral threads cut in a right-hand thread direction, those on the other mechanism being cut in a left-hand thread direction, and the gears 200 are cut in each case to correspond. This right and left spiral construction of the shafts 140 is preferable in that thereby on both mechanisms work or strain on the spindles s will cause the clutch element 141 to bind the more tightly with one and the other of the clutch elements 145 or 146. This right and left construction is illustrated in Figs. 9 and 10. If the shafts 140 on both mechanisms are either all right or all left, in making the adjustment last mentioned it will be necessary merely to change the holders 175 to opposite sides, not changing the shafts 140. In all cases, however, the brushes 210 must be suitably vertically adjusted to engage the spindles in their new relative arrangement. This is an important and valuable result, particularly as any given spiral element 140 is arranged to operate upon two of the spiral pinions 200 at the same time and wear upon the spiral shaft is therefore twice as great as that upon any one pinion during a given period. The spindle carriers 175 are suitably of aluminum, but I have very satisfactorily employed hard wood and have also designed a stamped metallic casing for this purpose. The shafts 140 are preferably of steel tubing. The brushing elements 210 are suitably of aluminum, as are also the casing 118 and the top 120 thereof. The several operative parts being positioned in the frame as illustrated, the frame itself may be of light material, as pointed out, and yet be very rigid and strong.

I have thus produced a machine quite notable for its lightness, which is an exceedingly important and valuable feature. Because of its comparatively small weight and the construction and arrangement of the transmission elements and of the operative parts of the other functional organizations, comparatively small power is required in the engine 70; that is, 12 H. P. has been found ample for simultaneously propelling the machine, picking cotton from the plants, brushing, conveying, etc., in actual use.

On the front end of each lower frame member 41 is secured as by bolts a slender and flexible spring guide 260 (Figs. 1 and 2) which is normally close to the ground at the forward end thereof and inclined upward toward the cleaning mechanisms respectively. The rear end of the guide 260 is free and is adapted normally to be positioned somewhat between the two picking mechanisms. As well shown in Fig. 2 the two elements 260 are first curved toward each other in front and are then more nearly parallel as they approach the picking mechanisms respectively. The guides 260 are preferably of flat strip metal to provide considerable resiliency laterally while being strong enough to lift the branches. These elements are respectively provided with a light fabric apron or shallow receptacle 261 secured to the guide 260 and to the frame part 41. The element 260 is adapted to underrun, raise and guide into cotton picking relation to the spindles low hanging or downwardly drooping branches; and the fabric apron 261 is adapted to catch cotton which may be shaken from the bolls while the branches are so being lifted and guided into the desired position. In practice the branches thus acted upon sweep and drag the loose cotton from the apron 261 into engagement with the spindles upon one or more of which it is at once secured. An advantageous feature of the construction shown is that should the operator negligently drive the machine so as not to preserve the row of plants substantially medial of the machine, the element 260 will be flexed away from the plants without injury to them.

Attention has been called to the fact that the spindles s on the two mechanisms are in intermeshing substantially parallel cotton picking relation to each other and operatively occupying substantially all of the space in the row where cotton may be found. In this connection it is pointed out that an additional advantageous function of the arrangement and construction shown resides in the fact that these substantially parallel oppositely mounted spindles have an easy and gentle cotton-seeking movement in the row with respect to adjacent spindles oppositely mounted. It will be observed from Fig. 4 that the spindle holders 175 on one mechanism are relatively slightly in advance of those on the other mechanism, the shaft 177 of one device being slightly in advance of the other with respect to the line of travel of the machine, which is to provide the alternating relation of the spindles shown in Fig. 4. While the spindles of the two mechanisms shown in Fig. 4 are not on the same horizontal plane, it will be observed that the vertical planes of the spindles are closer together at some places than at others, due to the parallelism of the spindles and their carriage about the shafts 177, and that the space between any two vertical and rearwardly moving planes on which oppositely mounted spindles rotate varies as the spindle progresses from one end of the picking position to the other. This movement is in the nature of a feeling about by the spindles for cotton in their respective localities and results in their covering a space of effective gathering considerably larger than if the movement just mentioned were not provided.

It has been mentioned hereinabove that I employ spindles adapted to gather cotton when rotated in clockwise direction in association with other spindles so adapted to work when rotated in an anticlockwise direction, with suitable provisions for thus oppositely simultaneously twirling the spindles on their respective axes. This provision is important in neutralizing, in a sense, the effect of spindle rotation in the row, tending to preserve bolls and other portions of the plant in their natural and normal positions and in other respects improving the picking result, as for instance in situations where cotton on the plant would not be engaged by a spindle rotating in one direction, say, being protected by leaves which would not yield to one movement of spindle rotation but which would readily yield to spindle rotation of the opposite kind. Another important result is in the lessening of the tendency to twist the cotton into ropes between spindles; and, further, in the lessening of the tendency of one spindle to pick cotton from an adjacent spindle well laden and having extending fibers or bunches reaching to the other in the process of rotation, this provision also preventing the oppositely rotating spindles from tearing the fibers respectively on each, and also preventing friction between bunches of cotton on adjacent spindles and in contact with each other. Further advantages are in the equalizing of strains upon the spindle holders respectively and upon the rotative shafts 140 therein.

It is also here pointed out that there are other notable advantages in arranging the spindles in pairs mounted in a single holder and adapted to travel in substantially the same plane, or, as may suitably be the case, one spindle of each pair positioned somewhat above the other horizontally, when employed in a device of the general arrangement shown. In such provision the first spindle of each pair, as the pair is being brought into picking position, takes substantially all of the strain which may be incident to lateral engagement with the plants. The second spindle of each pair is thus permitted to enter the picking position without any substantial lateral strain, and indeed each vertical row of such second spindles is so saved, and this without increasing the strains normally upon the spindles of the first vertical row. In other words, such strains throughout the entire machine are reduced one-half from what they would be if each vertical row of spindles was mounted on an independent spindle holder. In this connection an important feature of the device is described. By reference to Fig. 13 it will be seen that the cam element 181 is provided with a cam wall section 360 pivoted at 361 upon the cam element 181 and adapted to move on said pivot against the leaf spring 362. This spring element 362 normally keeps the section 360 in position whereby the continuity of the inner wall of the cam track 191 is preserved at this place. A cam track section, as 360 may be variously located in the cam device, or equivalent yielding means may be positioned anywhere operatively between the spindle and the cam element to provide give or yield to the spindles carried by the holder, as 175. In the drawings I have shown but one such means, to illustrate the function and result, and this is so positioned in the cam element that when the spindles on each holder 175 are coming into the picking position and likely to have some lateral strain thereon due to engagement with the plants, and particularly with the larger and more hardy plants, the friction roller or device 190 associated with the holders respectively will be in the cam track 191 at the movable wall element 360, and lateral strains upon the spindles, if sufficient to flex the spring 362, will cause the wall 360 to give way, and instead of the spindles being carried against the resisting plants strongly and positively, they are pressed thereagainst yieldingly, affording the plants opportunity to become better arranged and the spindles opportunity to adjust themselves in the plants under such spring-like action, thus saving the spindles from being broken or bent as well as the plant from being materially injured by unyielding lateral strains. The element 360 is so pivoted that as the device 190 travels in the track in the direction indicated by the arrow in Fig. 13 it will be caused to resume its normal position in the track 191 opposite the pivot 361. Suitable provisions may be made for thus taking up lateral strains on the spindles at any desired place in their course of travel, and the invention is not limited to the specific construction shown but in its broad aspect is in the provision of the combination of a spindle mounted to travel and means operatively associated therewith for relieving lateral pressure thereon during its course of travel.

The cam element 181 is positioned close to the ground when the machine is operatively traveling thereon, and in order to prevent dirt from finding its way into the cam track 191, (which it would do and in great quantities without suitable protection) I provide a casing therefor comprising a bottom element 365 secured upon the frame elements 42 and 42′ at the front and rear ends thereof and upon other frame elements 41 and 40ᵃ at the sides thereof (see Fig. 4), these frame elements constituting suitable end and side walls for the casing. The top of the casing preferably comprises a plate 366 having a circular opening of slightly greater diameter than that of the carrier plate 176, the plate 366 being positioned substantially in the plane of the plate 176 whereby said carrier substantially fills and rotates in the opening in the plate 366, as is well illustrated in the lower portion of Fig. 7. In Fig. 4 the upper plate 366 is removed in order better to illustrate the cam element beneath the same.

The engine 70 is suitably provided with water and gasolene from receptacles 380 and 381 respectively.

In this specification and in the claims I employ the words "revolve" and "revolution" to indicate the bodily movement of the spindle holder 175 about the axis of rotation of the carrier, as the plate 176, namely the shaft or axis 177, the carrier rotating on its axis, the spindle holders revolving about that axis. The travel of spindle holders or supports in an orbit about two axes of rotation, as where they are secured upon a belt or chain traveling upon spaced apart sprockets or wheels does not fall within the meaning of the words "revolve" or "revolution" as used herein.

While I have illustrated and described a suitable, effective and preferred structural embodiment of my improvements, the invention is not limited to the specific constructions and arrangements shown. Reference should be had to the appended claims to determine the scope of my improvements and advance in the art, and all changes from and modifications of the structures and arrangements pictured and described are contemplated by me as fall within the scope of these claims.

I claim:

1. In a cotton harvesting machine, the combination of a cotton picking spindle rotatably mounted, a spindle-driving element for rotating said spindle, and means for rotating said spindle-driving element, said means including a friction clutch device having the driven element thereof directly connected with said spindle-driving element.

2. In a cotton harvesting machine, the combination of a cotton picking spindle rotatably mounted, and means operatively associated therewith for rotating said spindle, said means including a power transmission device, said spindle rotating means having means for automatically increasing the power transmitting efficiency of said transmission device when resistance tending to prevent the rotation of said spindle is brought to bear upon the spindle.

3. In a cotton harvesting machine, the combination of a cotton picking spindle rotatably mounted, means including a friction clutch having a driving member and a driven member for rotating said spindle, and means intermediate said driving clutch member and said spindle for automatically providing a movement of said driven clutch member into closer frictional engagement with said driving clutch member when resistance to rotation is applied to said spindle.

4. In a cotton harvesting machine, the combination of a cotton picking spindle rotatably mounted, a rotatably mounted worm gear connected with said spindle so as to rotate the same when the gear is rotated, a rotatably mounted spiral gear intermeshing with said worm gear, said spiral gear being mounted so as to move bodily in an axial direction, and means for rotating said spiral gear, said means including a driven clutch element in driving relation to said spiral gear and a driving clutch element in operative association with said driven clutch element, said driven clutch element being adapted to move into contact with said driving clutch element when said spiral gear is moved axially, the arrangement being such that when resistance is brought to bear upon said spindle tending to prevent its rotation said spiral gear will move in an axial direction relatively to said worm gear and force said driven clutch element into closer operative association with said driving clutch element.

5. In a cotton harvesting machine, the combination of a spindle holder mounted to travel in a path, a driving shaft rotatably mounted in said holder, coöperating means on said shaft and spindle for rotating the spindle when the shaft is rotated, means for rotating said shaft, said shaft-rotating means including a clutch having a driving element and a driven element and means for rotating the driving element, the driven element of which clutch is rigidly connected with said shaft, one of said clutch elements being movable into driving association with the other, and means for so moving said one of said clutch elements, said means including a cam track relatively fixed with respect to said spindle holder and its path of travel and an element mounted for travel on said track as said spindle holder travels, said traveling element being operatively connected to said movable clutch element so as to move the same into engagement with said driving clutch element, and means for causing said spindle holder to travel in a path.

6. In a cotton harvesting machine, the combination of a rotatably mounted cotton picking spindle, and means for rotating said spindle in opposite directions, said means including a driven clutch element in driving relation to said spindle, a pair of clutch elements adapted to be alternately in driving relation to said first mentioned clutch element, means for rotating said secondly mentioned clutch elements in opposite directions respectively, and spring means adapted to maintain said driven clutch element in operative association alternately with each of said other clutch elements when said spindle is being rotated.

7. In a cotton harvesting machine, the combination of a rotatably mounted cotton picking spindle, and means for rotating the same on its axis alternately in one direction and then the other, said means including a driven clutch element and a pair of driving clutch elements, with means for rotating one of said driving clutch elements in one direction and for rotating the other thereof in the opposite direction, and means for moving said driven clutch element alternately into association with one and the other of said driven clutch elements.

8. In a cotton harvesting machine, the combination of a spindle holder mounted to travel in a path, means for carrying said spindle holder in such path, a cotton picking spindle rotatably mounted in said holder, a shaft rotatably mounted in said holder, coöperating means on said shaft and associated with said spindle adapted to rotate said spindle when said shaft is rotated, a driven clutch element on said shaft, a pair of driving clutch elements in operative relation to said driven clutch element, means for rotating one of said driving clutch elements in one direction, and means for rotating the other thereof in the opposite direction, and means for moving said driven clutch element alternately into driving association with one and the other of said driving clutch elements, said last mentioned means including a traveling device operatively connected to said driven clutch element, a relatively fixed track device having a track surface on spaced apart planes, said track device being arranged so that said traveling device will travel thereon as said spindle holder travels, the arrangement being such that as said traveling device is moved from one plane to another by said track device said driven clutch element is moved into operative association with one and then the other of said driving clutch elements.

9. In a cotton picking machine adapted to travel upon the ground, having a central passage longitudinally therethrough, and a picking mechanism adapted to project into said passage said passage being provided to accommodate cotton plants when the machine is in operative position, said machine having a relatively fixed frame element in the lower forward portion thereof, a raising and guiding device for plant branches comprising a resilient rod rigidly secured in fixed relation to said frame element in the lower forward portion of the machine, said rod inclining from its fixed connection upward toward a medial longitudinal line through said passage, and rearward, said rod terminating free near said picking mechanism.

10. In a cotton picking machine adapted to travel upon the ground and having a suitable frame, a pair of spring-like branch raising and guiding rods spaced relatively widely apart at their forward portions respectively and secured respectively in fixed relation to the frame at their respective forward portions, said bars or rods inclining upward, rearward and toward each other and terminating free.

11. In a cotton picking machine adapted to travel upon the ground and having suitable frame elements and a cotton picking mechanism intermediate the front and rear ends of the machine, a raising and guiding device for plant branches comprising a resilient bar in rigid association with the frame at a lower and forward portion thereof, said bar extending upward and rearward toward said picking mechanism, an apron-like receptacle of flexible material supported along one side of the same by said bar, said apron-like receptacle being suitably supported along another side thereof by a portion of the machine and being adapted to catch cotton shaken from cotton plants while portions thereof are being raised by said device.

12. In a cotton picking machine adapted to travel upon the ground, the combination of two substantially oppositely disposed rotatable picking mechanisms, each of said picking mechanisms having a plurality of rotatable cotton picking spindles projecting from the periphery thereof and carried in substantially circular paths about the axes of said picking mechanisms respectively, each of said picking mechanisms being mounted to rotate on an independent axis, said axes being so spaced apart as to provide a path for cotton plants directly between them, the spindles projecting from one mechanism being in deeply overlapped relation to the spindles of the other mechanism in said path, means for rotating each of said mechanisms, means for rotating said spindles respectively, and means associated with each of said mechanisms adapted to maintain said spindles in substantially parallel arrangement through a substantial portion of their travel while being so overlapped.

13. In a cotton picking machine adapted to travel upon the ground, the combination of a pair of substantially oppositely disposed picking mechanisms spaced apart and providing a path for cotton plants directly between them, each mechanism being adapted to rotate on an independent axis, each of said mechanisms having thereon a plurality of rotatable cotton picking spindles the spindles on each mechanism being carried in substantially circular paths respectively about said axes of rotation, spindles on one mechanism being adapted to overlap deeply spindles on the other mechanism and in substantially parallel and spaced apart relation when in cotton picking position in said path, means for rotating said mechanisms respectively, means for rotating said spindles on their respective axes, means for maintaining overlapped spindles in substantially parallel relation to each other through substantially their entire travel during the cotton picking operation in said path, and means for varying the spaced relation of the spindles of one mechanism to those of the other mechanism while so substantially parallel.

14. In a cotton picking machine, the combination of a pair of substantially oppositely disposed picking mechanisms, each thereof having rotatably mounted thereon a plurality of picking spindles, each of said mechanisms being mounted for rotation on an independent axis, said axes being spaced apart, means for rotating said mechanisms a gear wheel carried by each of said mechanisms and rotated therewith by said rotating means, said gear wheels intermeshing with each other, said gear wheels being independent of said means for rotating said mechanisms.

15. In a cotton picking machine having a rotatable cotton picking spindle thereon, spindle-cleaning mechanism comprising in combination a pair of coöperating brushing elements mounted on spaced apart axes and so as to have a brushing movement toward the point of such cotton picking spindle when the same is in cleaning position with respect to said brushing elements, said brushing elements being adapted to contact substantially opposite sides of such spindle, means for imparting such cleaning movement to said brushing elements respectively, and means for carrying a spindle into such cleaning position.

16. In a cotton harvesting machine, a cotton picking mechanism comprising in combination a spindle holder, a shaft rotatably mounted in said spindle holder, and means for rotating said shaft alternately in direct and reverse direction, said means including a pair of gears loosely mounted on said shaft, each of said gears having a clutch element connected therewith, a clutch element rigid upon said shaft and arranged to engage said other clutch elements alternately, means for moving said rigid clutch element alternately into engagement with said other clutch elements, and means for rotating said gears respectively in opposite directions.

17. In a cotton harvesting machine adapted to travel upon the ground, the combination of a cotton picking spindle rotatably mounted, means for rotating said spindle on its own axis, said spindle being mounted to travel bodily in a substantially circular path about an axis of revolution, means for causing said spindle so to travel, spindle cleaning apparatus mounted on said machine in the path of travel of said spindle, said cleaning apparatus comprising a rotatable brushing element so mounted as to brush cotton on said spindle toward the free end thereof, means for rotating said brushing element, and means operatively associated with said spindle adapted to vary the direction of the axial line through said spindle with respect to the axis of its substantially circular path of travel during its travel in association with said cleaning mechanism whereby said brushing element will continuously brush toward the free end of the spindle while the spindle and brush are in cleaning engagement with each other.

18. In a cotton picking machine, the combination of a spindle mounted at one end thereof for rotation on its axis and mounted also for bodily movement in a path of travel, means for rotating the spindle on its axis and means for carrying it in its path of travel, a spindle cleaning brush substantially in said path of travel and adapted to brush cotton from substantially the entire exposed portion of the spindle, and means for varying the axial direction of said spindle while at said brush whereby the free end of the spindle is the first part thereof and is also the last part thereof to be engaged by said brush.

19. In a cotton harvesting machine having picking spindles, the combination of a pair of spindle cleaning devices mounted to rotate on axes spaced apart and to operate simultaneously on a given spindle, means for rotating one of said devices in one direction and means for rotating the other of said devices in the opposite direction, and means for carrying said spindles into cleaning engagement with each of said cleaning devices.

20. In a cotton harvesting machine having cotton picking spindles, the combination of pair of spindle-cleaning brushing devices rotatably mounted on axes spaced apart and for rotation on different planes whereby a cotton picking spindle may be positioned in the space between the outermost planes of rotation of said two devices, said two devices being adapted to operate simultaneously on a given spindle means for carrying a spindle into such intermediate space, brushing elements on each of said devices positioned in such intermediate space, the respective planes of rotation of said brushing elements being so close together that such brushing elements will contact said spindle on substantially opposite sides thereof.

21. In a cotton harvesting machine having cotton picking spindles mounted to travel substantially in a plane, a pair of coöperating brushing devices mounted to rotate on different planes respectively and on spaced apart axes, each of said brushing devices having a brush proper thereon, one of said brushes proper having its brushing elements on the upper side thereof, the other brush proper having its brushing elements on the underside thereof when the brushes respectively are in cleaning position, said brushing devices being positioned with the plane of travel of said spindles between the planes of rotation of the brushing devices respectively, said brushing elements projecting into the space between the planes of rotation of the brushing devices respectively and adapted to contact said spindles.

22. In a cotton harvesting machine having picking spindles thereon and means for causing said spindles to travel into and out of engagement with spindle cleaning apparatus, spindle cleaning apparatus comprising in combination a pair of rotatable brushes each mounted to rotate upon its own axis, the axes of said brushes being so spaced apart that the circumference of rotation of one brush may overlap the circumference of rotation of the other brush during the cleaning operation, the upper side of one of said brushes, when in cleaning position, being provided with brushing elements, said other brush being provided with brushing elements on its underside when in cleaning position, said brushes being adapted to rotate on different planes whereby a cotton picking spindle may be positioned between such planes and be acted upon by said brushes respectively.

23. In a cotton harvesting machine having picking spindles thereon mounted to travel in a path, the combination of a rotatably mounted cleaning device, a brush proper on said cleaning device, said brush proper being positioned thereon with its longitudinal direction intersected by a radial line from the axis of rotation of said device and lying in the plane of rotation thereof, and means for carrying a picking spindle into contacting association with said brush proper, the arrangement being such that a cotton picking spindle advancing toward the brush in its path of travel will be first contacted by the outer portion of the brush proper, "outer" having respect to the axis of rotation of said cleaning device on which the brush proper is mounted.

24. In a cotton harvesting machine, the combination of picking spindles mounted to travel substantially in a plane, means for causing said spindles so to travel, a rotatable brushing device operatively in the path of travel of said spindles, said brushing device being provided with a plurality of brushes proper adapted cleaningly to engage such spindles, said brushes proper extending in their longitudinal directions respectively outwardly and at an angle to radial lines from the axis of rotation through the brushes proper respectively.

25. In a cotton picking machine, the combination with a rotatable cleaning device, of a brush proper mounted thereon for revolution thereby, means on said device providing a guideway for said brush proper, said brush proper having portions thereof adapted to interfit with said guideway-forming means, said guideway being positioned at a substantial angle to a radial line extending from the axis of rotation of said device, such radial line being in the plane of the brush proper, the arrangement being such that as the device rotates in one direction centrifugal force acting upon said brush proper will cause the same to bind against means forming said guideway.

26. In a cotton picking machine, the combination of a cotton picking spindle mounted to travel in a path, a brush support rotatably mounted and in the path of travel of said spindle, said brush support having brushes proper mounted readily removably thereon, said brush support being cut away between said brushes proper to form a clearance for cotton brushed from the spindle, means for carrying said spindle into brushing relation with said brushes proper, and means for rotating said brushing element.

27. In a cotton harvesting machine, the combination of a spindle-holder, a cotton picking spindle rotatably mounted therein, spindle-driving means comprising a rotatable shaft mounted for longitudinal movement in said holder, means operatively associated with said shaft and said spindle adapted to transmit rotative movement to said spindle from said shaft, a driven clutch element rigidly mounted on said shaft, a rotatable driving clutch element operatively associated with said driven clutch element, means for rotating said driving clutch element, and means for moving said shaft longitudinally to bring said driven clutch element into driving association with said driving clutch element.

28. In a cotton harvesting machine, the combination of spindle rotating means including a rotatable shaft, a picking spindle operatively connected therewith so as to be rotated thereby, a driven clutch element so mounted on said rotatable shaft as to communicate rotative movement thereto, a pair of driving clutch elements mounted to rotate in opposite direction and arranged in operative association with said driven clutch element, means for so oppositely rotating said driving clutch elements, and means for shifting said driven clutch element alternately into engagement with one and the other of said driving clutch elements whereby said spindle may alternately be rotated in opposite direction.

29. In a cotton harvesting machine, the combination of a rotatable spindle-driving shaft mounted for longitudinal movement in suitable bearings, said shaft having a gear transmission element thereon, a rotatably mounted spindle-driving gear in operative association with said first mentioned gear, a picking spindle mounted to be rotated by said spindle-driving gear, a driven clutch element rigidly mounted on said shaft, a pair of driving clutch elements mounted to rotate in opposite directions, said driving clutch elements being in operative association with said driven clutch element, means for moving said shaft longitudinally whereby said driven clutch element is moved alternately into association with one and the other of said driving clutch elements, and means for rotating drivingly in opposite directions said driving clutch elements respectively.

30. In a cotton picking machine, a spindle carrying mechanism, comprising in combination a movable carrier, a spindle holder mounted to oscillate on said carrier, a spindle-driving shaft rotatably mounted in said holder, said driving shaft having a gear thereon, a gear rotatably mounted in said holder on each side of said shaft and intermeshing with the gear thereon, the arrangement being such that the rotative motion of said shaft communicates rotative motion to each of said gears so mounted respectively on each side of said shaft, a cotton picking spindle connected with each of said driven gears so each of said spindles is rotated on its axis when said gears are rotated, said holder being pivoted in said carrier substantially axial with said shaft, the arrangement being such that strains applied simultaneously to said spindles, as in picking cotton thereby, will be communicated simultaneously to said holder on both sides of its axis of oscillation, the strains upon the spindles on one side of said shaft tending to balance the strains on the other side thereof.

31. In a cotton picking mechanism, the combination of means including a carrier adapted to carry picking spindles into cotton picking position and in contact with cotton plants when the machine is in cotton picking relation to a row of such plants, a spindle holder mounted on said carrier, a pair of cotton picking spindles mounted on said holder in spaced apart relation in substantially the same plane and substantially parallel to each other, said plane being substantially parallel with the plane of the travel of said spindles as said carrier travels, said holder maintaining said spindles normally in a fixed relation to each other, the arrangement of said spindles being such that as said pair of spindles is carried into cotton picking contact with cotton plants the second of said spindles in the order of their travel will be substantially protected from lateral plant-contacting strain by the first thereof.

32. In a cotton picking machine, the combination of a pair of cotton picking mechanisms, a spindle holder on each of said mechanisms, said spindle holders having provisions whereby the same are interchangeable from one mechanism to the other, each of said spindle holders having mounted therein a plurality of cotton-picking spindles, means for rotating the spindles in each holder respectively, said means including a shaft rotatably mounted in each spindle holder, each of said shafts having a driving spiral gear thereon, and a driven spiral gear operatively connected with each of the spindles on each holder respectively, there being one such driven gear for each spindle, all of the driven gears in each holder being intermeshed with the driving spiral gear on the shaft therein, said driven gears being positioned relatively higher on one spindle carrier than on the other with respect to said shafts respectively, the arrangement being such that when said spindle holders are interchanged from one mechanism to the other, said driving shafts however not being interchanged, a fresh and unused portion of the driving gear on each of said driving shafts adapted to intermesh with said driven gears when so interchanged is provided.

33. In a cotton harvesting machine, the combination of a substantially circular carrier plate rotatably mounted on a substantially vertical axis, a cam element having a guideway therein beneath said carrier plate, a plurality of spindle holders carried by said plate and mounted to oscillate thereon, means adapted to travel in said cam guideway and connected with each of said spindle holders whereby the spindle holders are oscillated as the carrier rotates, and a cover for said cam element, said cover comprising a plate having a circular opening therein slightly greater in diameter than said carrier plate, said cover plate being so positioned that the edge of said carrier plate rotates close to the edge of said cover plate about said opening.

34. In a cotton harvesting machine, the combination of a carrier plate mounted to rotate and a casing having top, bottom and side walls mounted to rotate in unison therewith, a plurality of spindle holders having their lower ends respectively pivoted in said plate and their upper ends respectively pivoted in the bottom wall of said casing, each of said spindle holders having a spindle-driving shaft rotatably mounted therein, said spindle driving shafts respectively projecting into said casing, operative mechanism for rotating each of said shafts respectively, some of such operative mechanism being within said casing whereby the same is protected.

35. In a cotton picking machine, a spindle holder comprising in combination two casing-like parts adapted to be secured one upon the other to form a casing-like holder, said holder being hollowed longitudinally interiorly a driving shaft having a gear thereon and mounted to rotate in the hollow portion of said casing in suitable bearings, each of said casing-like parts being provided with a bearing recess, said recesses being oppositely disposed and facing each other when the parts are properly secured together, a gear wheel operatively intermeshing with said other gear and rotatably mounted in each of said oppositely disposed bearing recesses, one of said casing-like parts having an aperture axial with the axis of rotation of said secondly mentioned gear, a cotton picking spindle connected with said secondly mentioned gear by means of suitable provisions extending through said aperture, the arrangement being such that said gears are in operative association with each other in a substantially closed housing.

36. In a cotton harvesting machine, the combination of a spindle holder mounted to turn upon its longitudinal axis, a carrier on which said holder is mounted, said carrier being mounted for rotation and thereby to carry said spindle holder in a circular path, a pair of spindles rotatably mounted side by side in said holder to travel substantially in the same plane, unitary means for rotating said spindles, an element providing a relatively fixed cam track, a device adapted to travel in said cam track, said device being operatively connected with said holder, the arrangement being such that as said holder moves in its path of travel about the axis of rotation of said carrier said holder will be turned on its own axis through the influence of said cam track element.

37. In a cotton harvesting machine, the combination of a carrier rotatably mounted, a spindle holder pivotally mounted in said carrier and adapted thereby to have a circular path of travel, a pair of spindles rotatably mounted side by side in said holder, and adapted to travel in the same plane, means for rotating each spindle alternately in direct and reverse direction, means for rotating said carrier, and means for varying the axial direction of said spindles with respect to the axis of rotation of said carrier as said spindle holder is carried in its path of revolution about said carrier axis.

38. In a cotton harvesting machine, the combination of a cotton picking mechanism comprising a spindle holder, a longitudinally movable and rotatably mounted shaft in said spindle holder, a spindle rotatably mounted in said spindle holder, means for communicating rotative movement from said shaft to said spindle, and means for rotating said shaft, said means including a clutch device having a driving element and a driven element on said shaft, one of said clutch elements being loosely mounted and the other thereof being drivingly mounted on the shaft, the longitudinal movement of said shaft being adapted to bring said clutch elements together, said driving clutch element having a gear, means for longitudinally moving said shaft, and means for rotating said clutch gear.

39. In a cotton picking machine adapted to travel upon the ground and having a central passage longitudinally therethrough for cotton plants and a picking mechanism adapted to project into said passage, said machine having a suitable frame element forward of said picking mechanism, the combination therewith of a raising and guiding device for plant branches comprising a rod secured to said frame element and extending from a point relatively close to the ground to a higher elevation close to said picking mechanism, and an apron-like receptacle secured to said rod and to a portion of said machine spaced therefrom to form a trough for collecting cotton which falls from the plants while being raised.

40. In a cotton harvesting machine, the combination of a plurality of spindle holders mounted to travel in a path, each of said spindle holders having a rotatable spindle and a rotatable spindle-driving shaft therein, means for communicating rotation from said shafts to said spindles respectively, means for rotating said shafts in one direction at one place in their course of travel and in the reverse direction at another place in their course of travel, said means including a driving gear adapted to rotate in one direction and a driving gear adapted to rotate in another direction, a pair of gears on each of said shafts, one of each pair being in mesh with one of said driving gears, the other gear on each shaft being in mesh with the other of said driving gears, and means for communicating to said shaft alternately rotative movement from one and the other of said driving gears.

41. In a cotton harvesting machine having a rotatable spindle mounted to travel in a path, the combination therewith of means for rotating said spindle alternately in direct and reverse directions, said means including a shaft, a driven clutch element thereon, a pair of driving clutch elements, said driven clutch element being adapted to be associated operatively alternately with one and then the other of said driving clutch elements, means for rotating said driving clutch elements respectively in such direction that said shaft rotates in opposite directions when said driven clutch element operatively contacts one and then the other of said driving clutch elements, and means including a pair of tracks each having an inclined surface for moving said shaft whereby said driven clutch element is moved from engagement with one into engagement with the other of said driven clutch elements.

In a cotton harvesting machine having a rotatable spindle mounted to travel in a path, the combination therewith of means for rotating said spindle, said means including a shaft, a driven clutch element thereon, a driving clutch element, and means for moving said shaft whereby the clutch elements contact each other, said last mentioned means including a track having an inclined surface.

43. In a cotton harvesting machine, the combination of a pair of cotton picking spindles mounted substantially side by side and adapted to rotate on their axes respectively, and unitary means comprising a spiral gear operatively associated with said spindles adapted to rotate the same simultaneously, said spiral gear being mounted for movement in its axial directions.

44. In a cotton picking mechanism, the combination of a pair of rotatable spindles and means for simultaneously rotating one of them in one direction and the other thereof in the opposite direction, said means comprising a driving spiral gear mounted for movement in its axial directions, and a pair of driven spiral gears intermeshing with said driven gear, each of said spindles being connected rotatably with one of said driven gears, and means for rotating said driving gear.

45. In a cotton harvesting machine adapted to travel upon the ground, the combination of a substantially vertically mounted spindle holder, a pair of rotatable spindles mounted side by side substantially in a horizontal plane on said spindle holder, said spindle holder being pivotally mounted whereby said spindles may be moved simultaneously through a partial orbit about the axis of said holder, said spindle holder being mounted to revolve in a complete orbit about another axis, unitary means for rotating said spindles simultaneously on their own axes, means for moving said spindles through such partial orbit, and means for revolving said spindle holder through a complete orbit about said axis of revolution.

46. In a cotton harvesting machine adapted to travel upon the ground, the combination of a spindle holder, a plurality of pairs of rotatable spindles mounted side by side on said spindle holder, said spindle holder being pivotally mounted to oscillate whereby said spindles may move through a partial orbit on the axis of oscillation of said holder, unitary means for simultaneously rotating one spindle of each pair in one direction and the other thereof in the opposite direction, means for oscillating said holder, and means for rotating said spindles respectively.

47. In a cotton harvesting machine adapted to travel upon the ground, the combination of a pair of oppositely disposed supports each thereof mounted to rotate on an independent axis, said axes being spaced apart whereby one of said axes may be on one side of a row of cotton plants and the other axis may be on the other side thereof when the machine is in cotton picking relation to such row, and a picking spindle holder mounted for revolution by and to oscillate on each of said supports, each of said holders being spaced from the axis of rotation of said supports respectively, a picking spindle rotatably mounted in each of said holders, said spindles being arranged to overlap each other in spaced apart relation when in operative cotton picking position, means for rotating each of said supports, means for oscillating each holder on its support, means for rotating each of said spindles, and resilient means associated with each of said oscillating means for providing a lateral yielding of said spindles when lateral strains are brought to bear on them respectively while in cotton picking position.

48. In a cotton harvesting machine adapted to travel upon the ground, the combination of a pair of oppositely disposed rotatable cotton picking mechanisms, each of said mechanisms comprising a plurality of rotatable cotton picking spindles carried in a circular path by said mechanisms respectively and projecting from each thereof, spindles projecting from one of said mechanisms being arranged to overlap in spaced relation spindles projecting from the other of said mechanisms, means associated with said mechanisms respectively adapted to vary the longitudinal direction of said spindles respectively with respect to the axis of rotation of said mechanisms respectively while the spindles are in such overlapped relation with respect to each other, means for rotating each of said mechanisms on its own axis, means for rotating said spindles on their own axes respectively, and resilient means for providing a yielding of said spindles when lateral strains are brought to bear upon them while in cotton picking position.

49. In a cotton harvesting machine, the combination of a carrier mounted to carry a cotton picking spindle in a path of travel, a spindle holder on said carrier and carried thereby, a picking spindle rotatably mounted in said holder, a cleaning device in the path of travel of said spindle, said cleaning device comprising a pair of rotatable brushes on spaced apart axes and each brush arranged to contact said spindle, means for rotating said brushes whereby each thereof sweeps toward the free end of the spindle, means for rotating said spindle in cotton picking direction at one place in the path of travel of said spindle, and means for rotating said spindle in reverse direction where the same is in association with said cleaning device.

50. In a cotton picking machine adapted to travel upon the ground, the combination of a pair of carriers adapted to carry cotton picking spindles in respective paths of travel, each of said carriers being mounted to rotate on a substantially vertical axis, said axes being spaced apart, a spindle holder pivotally mounted on each of said carriers so as to oscillate thereon respectively, a plurality of pairs of cotton picking spindles rotatably mounted on each of said holders respectively, said spindles being arranged with one spindle of each of said pairs in advance of the other thereof in the path of travel of each thereof, the spindles of each of said holders overlapping deeply in spaced relation the adjacent spindles respectively on the other holders, the spindles so overlapped and spaced apart being in cotton picking position, means associated with said holders adapted to vary the longitudinal direction of the spindles respectively during a substantially large portion of their course of travel in such cotton picking position whereby spindles on one holder are maintained in substantially parallel relation with the spindles on the other while in such overlapped relation, means for rotating one spindle of each of said pairs of spindles in one direction and the other thereof in the opposite direction, and means for rotating said carriers respectively whereby said spindles are carried into and out of cotton picking position.

51. In a cotton picking machine adapted to travel upon the ground, the combination of a pair of carriers adapted to carry cotton picking spindles in respective paths of travel, each of said carriers being mounted to rotate on a substantially vertical axis, said axes being spaced apart, a spindle holder pivotally mounted on each of said carriers so as to oscillate thereon respectively, a pair of cotton picking spindles arranged to travel in substantially the same plane rotatably mounted on each of said holders respectively, the spindles of each of said holders overlapping deeply in spaced relation the adjacent spindles respectively on the other holders, the spindles so overlapped and spaced apart being in cotton picking position, means associated with said holders adapted to vary the longitudinal direction of the spindles respectively during a substantially large portion of their course of travel in such cotton picking position whereby spindles on one holder are maintained in substantially parallel relation with the spindles on the other while in such overlapped relation, means for rotating said spindles, and means for rotating said carriers respectively whereby said spindles are carried into and out of cotton picking position.

52. In a cotton picking machine, the combination of a carrier adapted to carry a cotton picking spindle in a path of travel and repeatedly into association with a brushing device, a spindle holder mounted on said carrier, a spindle mounted on said spindle holder, a substantially rigid band on each side of said spindle providing a substantially parallel guideway for said spindle in its path of travel, means operatively associated with said spindle adapted to withdraw the same from said guideway, a rotatable brushing device in the path of travel of said spindle adapted to brush cotton therefrom, means for rotating said brushing device, said bands being positioned so close, respectively to said spindle on either side thereof that when said spindle is withdrawn from said guideway the cotton thereon will be scrapingly moved toward the free end of the spindle, one of said bands being formed to provide a clearance opening in said guideway adapted to permit cotton scraped and bunched on said spindle to pass between the bands, the arrangement being such that on the return of said spindle into association with said brushing device such scraped and bunched cotton will be in position thereon for removal therefrom by said brushing device.

53. In a cotton harvesting machine, the combination of a spindle holder mounted to turn upon its longitudinal axis, a carrier on which said holder is mounted, said carrier being adapted to carry said holder in a path of travel, an element providing a cam track, a device adapted to travel in said cam track, said device being operatively connected with said holder, the arrangement being such that as said holder moves in its path of travel it will be turned on its axis through the influence of said cam track element, and cushioning means operatively associated with said device adapted to move in said cam track, said cushioning means being adapted to permit said spindle to move yieldingly when lateral strains are applied thereto.

54. In a cotton picking machine, the combination of a rotatable brush adapted to clean cotton from a picking spindle, a picking spindle, means for carrying said spindle into cleaning association with said brush, means for rotating said brush, and a screen in the path of discharge of cotton from said brush adapted to separate dirt from cotton discharged from the brush.

55. In a cotton picking machine, the combination of a spindle holder, a carrier on which said spindle holder is mounted, said carrier being adapted to provide a path of travel for said spindle holder, a spindle rotatably mounted in said holder, an element providing a cam guideway, an element adapted to travel in said guideway and operatively connected to said spindle holder whereby as said spindle holder moves in its path of travel it will be moved on its axis of oscillation, a wall of said cam guideway comprising a section thereof being mounted to move away from the normal wall line and back again into normal position, and spring means associated with said section adapted yieldingly to hold said section in its normal position, the arrangement being such that lateral pressure exerted upon said spindle when said element adapted to travel in said guideway is in the portion of said guideway having said yielding wall section will cause said section so yieldingly to move away from its normal position whereby said spindle will yieldingly respond to such lateral pressure.

56. In a cotton harvesting machine, the combination of a carrier, a spindle holder mounted to rock on said carrier, said carrier being mounted to carry said spindle holder in a path of travel, a picking spindle mounted on said holder, means for rocking said spindle holder on its axis, and spring means associated with said last mentioned means and said spindle holder adapted to permit said spindle holder to move on its axis yieldingly when lateral strain is brought to bear on said spindle.

57. In a cotton picking machine, the combination of a carrier, a spindle holder pivotally mounted on said carrier, a picking spindle mounted on said holder, means associated with said spindle holder adapted to move the same on its axis during its course of travel, and means in operative association with said holder adapted to give away yieldingly when lateral strain is brought to bear on said spindle.

58. In a cotton picking machine having a cotton picking spindle, spindle cleaning apparatus comprising in combination a cotton scraping element so positioned with respect to said spindle that when said spindle is drawn away therefrom cotton on the spindle will be forced toward the free end thereof, and a rotatable brush adapted to brush such cotton from the spindle, means for carrying the spindle into such scraping and brushing position and for withdrawing the same from said scraping element, and means for rotating said brush.

59. In a cotton picking machine having a rotatable spindle adapted to disengage cotton thereon when rotated in a direction reverse to its cotton picking direction, spindle cleaning apparatus comprising in combination a rigidly mounted and substantially unyielding cotton scraping device adapted when the spindle is withdrawn therefrom to move the cotton on the spindle toward the free end of the spindle, means for carrying the spindle into engagement with said scraping device, means for withdrawing the same therefrom while the spindle is rotating in such reverse direction, and means for rotating said spindle in direct and reverse direction, the arrangement being such that the reverse rotation of the spindle coöperates with said scraping device in removing the cotton from the spindle, said scraping device substantially holding the cotton while the spindle is being disengaged therefrom.

60. In a cotton picking machine having a rotatable spindle adapted to disengage cotton therefrom when rotated in a direction reverse to its cotton picking direction, spindle cleaning means comprising cotton scraping means including a bar having a scraping edge adapted substantially to engage said spindle, said scraping means being substantially fixed and so positioned with respect to said spindle that when said spindle is withdrawn from said scraping means cotton on the spindle will be forced toward the free end thereof, means for carrying said spindle into engagement with said scraping means, means for withdrawing the same therefrom while the spindle is rotating in such reverse direction on its axis, the arrangement being such that the reverse rotation of the spindle coöperates with said scraping means to free the cotton and remove the same from the spindle.

61. In a cotton picking machine, the combination of a cotton picking spindle, a rotatable shaft, a gear drivingly connected to said spindle, a gear on said shaft, said gears intermeshing, means for rotating said shaft, said means including a driven friction clutch element on said shaft and a friction driving clutch element in operative association therewith, and spring means operatively associated with said clutch mechanisms adapted to control the engagement of said driven clutch element with said driving clutch element.

62. In a cotton harvesting machine having picking spindles thereon mounted to travel in a path and to pick cotton from cotton plants, the combination of a rotatably mounted brush positioned to engage such spindles in their path of travel and to disengage therefrom cotton picked thereby, and means adapted to disengage cotton from said rotary brush after said cleaning device has disengaged cotton from such spindles.

63. In a cotton harvesting machine having picking spindles thereon mounted to travel in a path and to pick cotton from cotton plants, the combination of a rotatably mounted brush positioned to engage such spindles in their path of travel and to disengage therefrom cotton picked thereby, and rotary brushing means adapted to disengage cotton from said rotary brush after said cleaning device has disengaged cotton from such spindles.

64. In a cotton picking machine, the combination of a pair of brushing elements mounted to rotate on independent axes spaced apart and on different planes, each of said brushing elements comprising a plurality of brushes proper extending substantially in a radial direction from the axes about which they rotate respectively, the brushes proper on one brushing element being adapted to travel in a path deeply overlapping the path of travel of the brushes proper of the other brushing element, the brushes proper of each of said elements being adapted to brush cotton from a picking spindle therebetween, means for carrying a cotton picking spindle between the respective paths of travel of said brushes proper, and means for rotating said brushing elements.

65. In a cotton harvesting machine, a carrier adapted to travel in a path adjacent to a row of cotton plants, and means for causing the carrier so to travel, means on said carrier for supporting a cotton picking spindle, and cushioning means operatively associated with said spindle-supporting means whereby said spindle-supporting means and the spindle supported thereby may yield against lateral resistance encountered by the spindle in its course of travel.

66. In a cotton harvesting machine, the combination of a picking spindle, means for moving the same in a path of travel, a rotatably mounted shaft, a spindle-cleaning device rotatably carried by said shaft and extending substantially into the path of travel of said spindle, said spindle-cleaning device being adapted substantially to contact said spindle and to clean cotton therefrom when the spindle is at said cleaning device, said shaft being mounted for longitudinal movement, and means for longitudinally adjusting said shaft whereby said cleaning device may be adjusted with respect to the path of travel of said spindle at said cleaning device, and means for rotating said cleaning device.

67. In a cotton harvesting machine, the combination of a picking spindle, means for carrying same in a path of travel, a rotatably mounted shaft adjacent to the path of travel of said spindle, a brush on said shaft and rotated thereby, said brush having brushing elements substantially extending into the path of travel of said spindle so as substantially to contact said spindle on one side thereof as the spindle travels in its path at said brush, said shaft being mounted for longitudinal movement, and means for adjusting said shaft longitudinally whereby the plane of rotation of said brushing elements is adjusted with respect to the path of travel of said spindle at said brush.

68. In a cotton harvesting machine, the combination of a plurality of picking spindles substantially horizontally mounted and on spaced apart substantially horizontal planes, said spindles being mounted for travel in respective paths, a substantially vertical shaft adjacent to such paths of spindle travel, a plurality of spindle cleaning brushes carried by said shaft, means for rotating said brushes, said respective brushes being arranged to brush against the respective spindles substantially on one side of each respectively, said shaft being mounted for longitudinal movement, and means for adjusting said shaft longitudinally, the arrangement being such that by longitudinally moving said shaft adjustably each of said brushes is simultaneously adjusted with respect to the path of travel of the spindle it is adapted to clean.

69. In a cotton harvesting machine, the combination of a spindle mounted to travel in a path, means for causing the spindle so to travel, a pair of cleaning brushes rotatably mounted on spaced apart axes, said brushes being adapted to rotate on different planes, said spindle being adapted to travel on a plane substantially between said brushes and to be contacted thereby, each of said brushes being mounted for adjustment toward and away from said path of spindle travel, and means for rotating said brushes.

70. In a cotton harvesting machine, the combination of a spindle mounted to travel in a path, means for causing the spindle so to travel, a pair of brush shafts spaced apart and rotatably mounted, a brush carried by each of said shafts and arranged to rotate substantially on spaced apart planes, said spindle being adapted to travel between said brushes and substantially to be contacted thereby, said shafts being mounted for longitudinal movement, and means for adjusting said shafts longitudinally whereby said brushes may be adjusted with respect to the path of travel of said spindle at said brushes.

71. In a cotton harvesting machine, the combination of a machine frame, a cotton picking mechanism including picking spindles carried by said frame, a spindle cleaning mechanism comprising a battery of brushes in unitary arrangement adapted to clean said spindles, a movably mounted support carried by said frame, said spindle cleaning mechanism being secured to and carried by said support, means for releasably holding said support with said cleaning mechanism in operative relation to said picking mechanism, the arrangement being such that by releasing and moving said support carrying said cleaning mechanism access may be had to said battery of brushes as for cleaning and repair of the same.

72. In a cotton harvesting machine, the combination of a machine frame, a cotton-picking mechanism including picking spindles carried by said frame, a spindle cleaning mechanism adapted to clean said spindles, a hinged support carried by said frame, said cleaning mechanism being secured to said hinged support, means for releasably holding said support with the cleaning mechanism in operative relation to said picking mechanism, the arrangement being such that by releasing and moving said support said cleaning mechanism is moved out of operative relation to said picking mechanism.

73. In a cotton harvesting machine, the combination of a picking spindle mounted to rotate and to travel in a path, means for carrying said spindle in a path, means for rotating said spindle, said spindle-rotating means comprising a driven clutch element in driving relation to said spindle, a driving clutch element in driving relation to said driven clutch element, one of said clutch elements being movable toward and away from the other thereof and means for moving said movable clutch element into engagement with the other thereof.

74. In a cotton harvesting machine, the combination of a picking spindle mounted to rotate and to travel in a path, means for carrying said spindle in a path, means for rotating said spindle, said spindle-rotating means comprising a driven clutch element in driving relation to said spindle, a driving clutch element in driving relation to said driven clutch element, one of said clutch elements being movable toward and away from the other thereof, means for moving said movable clutch element into engagement with the other thereof, and spring means for holding said movable clutch element in operative association with said other clutch element.

75. In a cotton harvesting machine, the combination of a picking spindle mounted to rotate and to travel in a path, means for carrying said spindle in a path, means for rotating said spindle, said spindle-rotating means comprising a driven clutch element in driving relation to said spindle, a driving clutch element in driving relation to said driven clutch element, one of said clutch elements being movable toward and away from the other thereof, means for moving said movable clutch element into engagement with the other thereof, said last mentioned means including a relatively fixed cam.

76. In a cotton harvesting machine, the combination of a picking spindle mounted to rotate and to travel in a path, means for carrying said spindle in a path, means for rotating said spindle, and spindle-rotating means comprising a driven clutch element in driving relation to said spindle, a driving clutch element in driving relation to said driven clutch element, one of said clutch elements being movable toward and away from the other thereof, means for moving said movable clutch element into engagement with the other thereof, said last mentioned means including a relatively fixed cam, and spring means adapted to hold said movable clutch in operative engagement with said other clutch element.

77. In a cotton harvesting machine having a rotatable spindle mounted to travel in a path, the combination therewith of means for rotating said spindle, said means including a shaft in driving relation to said spindle, a driven clutch element on said shaft, a driving clutch element adapted to be in driving relation to said driven clutch element, said shaft being movable longitudinally, the longitudinal movement of said shaft being adapted to carry said driven clutch element into operative engagement with said driving clutch element, means for moving said shaft longitudinally, and spring means for holding said two clutch elements in operative association with each other, means for driving said driving clutch element, and means for carrying said spindle in a path.

78. In a cotton harvesting machine the combination of a spindle mounted to travel in a path and to rotate, means for causing the spindle so to travel, and means for rotating said spindle, said rotating means including a shaft having a spiral thread thereon, a gear in mesh with said spiral thread, said spindle being in driven relation to said gear, a driven clutch element in driving relation to said shaft, a driving clutch element in driving relation to said driven clutch element, and means for controlling the coactive relation of said two clutch elements whereby one is driven by the other, said means including a clutch moving device connected to one of said clutch elements, and a relatively fixed track having an inclined surface adapted to be engaged by said clutch moving device at predetermined intervals, said clutch moving device being mounted to travel in a path simultaneously with said spindle, and means for rotating said driving clutch element.

EXTA LIGHTFOOT.

Witnesses:
T. D. BUTLER,
M. M. KRIESAND.